(12) United States Patent
Leyendecker et al.

(10) Patent No.: US 8,034,191 B2
(45) Date of Patent: Oct. 11, 2011

(54) CLEANING PLANT

(75) Inventors: Hansfried Leyendecker, Monschau (DE); Robert Pauels, Stolberg (DE)

(73) Assignee: Durr Ecoclean GmbH, Filderstadt (DE)

( * ) Notice: Subject to any disclaimer, the term of this patent is extended or adjusted under 35 U.S.C. 154(b) by 843 days.

(21) Appl. No.: 11/781,053

(22) Filed: Jul. 20, 2007

(65) Prior Publication Data
US 2008/0006306 A1 Jan. 10, 2008

Related U.S. Application Data

(63) Continuation of application No. PCT/EP2006/000163, filed on Jan. 11, 2006.

(30) Foreign Application Priority Data

Jan. 22, 2005 (DE) .......................... 10 2005 003 093

(51) Int. Cl.
*B08B 5/04* (2006.01)

(52) U.S. Cl. ......................................... 134/31
(58) Field of Classification Search ...................... 134/31
See application file for complete search history.

(56) References Cited

U.S. PATENT DOCUMENTS

| | | | |
|---|---|---|---|
| 4,936,329 A | 6/1990 | Michael et al. | |
| 4,974,619 A | 12/1990 | Yu | |
| 5,450,867 A | 9/1995 | Galuszka | |
| 5,513,983 A * | 5/1996 | Ito et al. ........................ | 432/205 |
| 5,658,105 A * | 8/1997 | Takahashi ..................... | 409/134 |

FOREIGN PATENT DOCUMENTS

| | | |
|---|---|---|
| DE | 39 03 607 A1 | 8/1990 |
| DE | 96 06 044 U1 | 6/1994 |
| DE | 43 41 020 A1 | 6/1995 |
| EP | 0 110 525 A1 | 6/1984 |
| EP | 0 114 424 A2 | 8/1984 |
| JP | 11-277348 A | 10/1999 |
| JP | 2001-347236 A | 12/2001 |

\* cited by examiner

*Primary Examiner* — Michael Kornakov
*Assistant Examiner* — Samuel Waldbaum
(74) *Attorney, Agent, or Firm* — Leydig, Voit & Mayer, Ltd.

(57) ABSTRACT

In order to produce a cleaning plant for cleaning work pieces which comprises at least one cleaning station in which the workpiece is subjected to a cleaning process in such a manner that the cleaning process can be organized in a flexible manner and easily adapted to changes in the workpiece, it is proposed that the cleaning plant should comprise at least one manipulating device which picks up a workpiece prior to treatment in a treatment area of the cleaning station, supplies the workpiece to the treatment process within the treatment area of the cleaning station and passes on the workpiece after the treatment in the treatment area of the cleaning station.

16 Claims, 29 Drawing Sheets

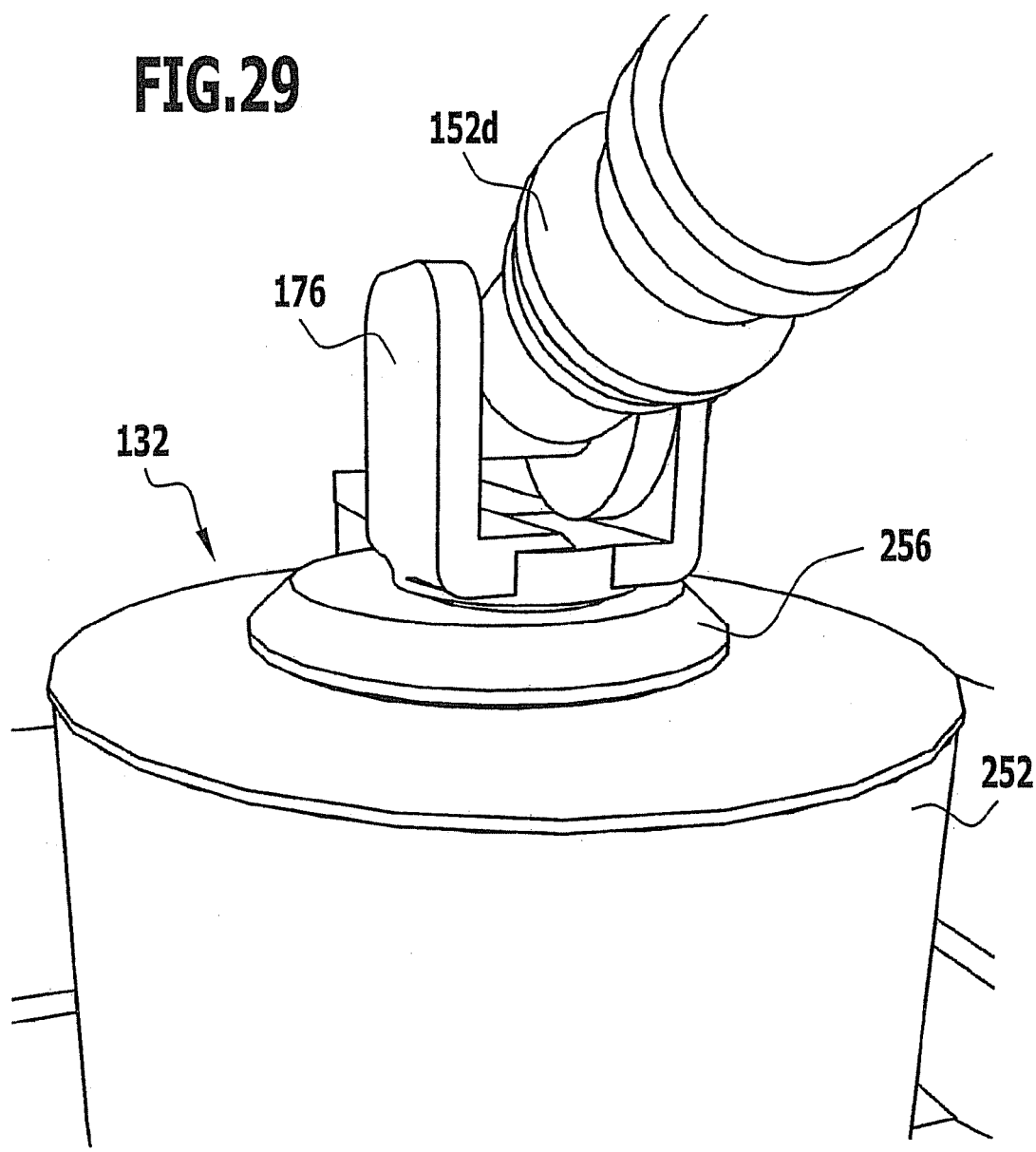

CLEANING PLANT

RELATED APPLICATION

This application is a continuation application of PCT/EP2006/000163 filed Jan. 11, 2006, the entire specification of which is incorporated herein by reference.

FIELD OF DISCLOSURE

The present invention relates to a cleaning plant for cleaning workpieces which comprises at least one cleaning station in which the workpieces are subjected to a cleaning process.

BACKGROUND

Such cleaning plants are known from the state of the art.

In particular, multi-chamber or multi-station cleaning plants are known wherein the internal transportation of the workpieces from station to station is accomplished by means of conveying devices such as walking beam conveyers, lift-over devices or roller-track conveyers for example.

In the case of the conveying devices used up to now for the internal transportation of the workpieces within the plant, the orientation of the workpieces does not vary. At best, the workpiece is rotated within a cleaning station about a horizontal or vertical axis of rotation. In the case where use is made of walking beam conveyers, the retention time of the workpiece in a cleaning station is also unalterable and is of the same length in each of the cleaning stations. For every change in the workpiece requiring cleaning and for each change in the cleaning process, the cleaning plant must be reconfigured.

SUMMARY OF THE INVENTION

The object of the present invention is to produce a cleaning plant of the type specified hereinabove which permits the cleaning process to be organized in a flexible manner and easily adapted to changes in the workpiece.

In accordance with the invention, this object is achieved by a cleaning plant in accordance with Claim 1 which comprises at least one manipulating device which picks up a workpiece prior to treatment in a treatment area of the cleaning station, supplies the workpiece to the treatment process in the treatment area of the cleaning station and passes on the workpiece after the treatment in the treatment area of the cleaning station.

The solution in accordance with the invention enables the treatment process within the treatment area of the cleaning station to be varied and in particular adapted to the changed workpiece geometry when there is a change in the workpiece simply by altering the pattern of movement of the manipulating device without reconfiguration of the cleaning plant being necessary for this purpose.

Moreover, the use of a manipulating device for moving the workpiece enables individual borings and other critical points of the workpiece to be subjected to the treatment by appropriate control of the manipulating device using a simply constructed treatment device having static treatment means without the need to use moveable parts, such as moveable spraying lances for example, in the treatment device.

Thus, to a large extent, the mechanical construction of the cleaning plant in accordance with the invention is capable of being standardised independently of the type of workpieces requiring cleaning.

Preferably, the manipulating device is provided with a programmable control system so that an alteration to the pattern of movement of the manipulating device is realizable by changes in the software alone. Thus, the cleaning plant can be adapted to workpieces of altered geometry by changes in the software alone; nevertheless, an adjustment to a gripping device in the manipulating device in response to the altered geometry of a workpiece could also be necessary.

The manipulating device of the cleaning plant in accordance with the invention can take over the workpiece prior to the treatment at a work piece's point of entry into the cleaning plant or else from another manipulating device arranged upstream of the manipulating device or from a workpiece storage means or a workpiece moving device which is inserted between two successive manipulating devices.

Furthermore, the manipulating device can hand over the workpiece after the treatment at a work piece's point of exit from the cleaning plant, to another manipulating device arranged downstream from the manipulating device or to a workpiece storage means or workpiece moving device which is inserted between two successive manipulating devices.

Apart from a process which serves to free the workpiece from foreign bodies and/or adhering liquids, the expression "cleaning process" as used in this description and in the attached Claims is to be understood as being any such process that is usually carried out in the course of a workpiece cleaning treatment, in particular, a drying process or a workpiece deburring process.

In a preferred embodiment of the cleaning plant in accordance with the invention, provision may be made for the pattern of movement of the manipulating device to be controllable in a manner specific to the type of work piece in dependence on the type of workpiece currently being handled. This not only permits the cleaning plant to be reset from one type of workpiece to another type of workpiece in a simple manner, but it also enables workpieces of different workpiece types that are following each other in a mixed sequence to be treated in the same cleaning plant.

In order to enable the workpiece to be moved relative to the respective treatment device within the treatment area by means of the manipulating device in as free a manner as possible, both in regard to translatory movements as well as rotational movements, it is expedient for the manipulating device to exhibit at least three, preferably at least four, degrees of freedom of movement.

In this description and in the attached Claims, the expression "rotational movement" is to be understood as being any movement about a static or moveable axis of rotation which can be implemented through arbitrary angles and with or without changes in the direction of rotation.

The manipulating device preferably comprises a gripping device for grasping the workpiece.

In a preferred embodiment of the cleaning plant in accordance with the invention, provision is made for the manipulating device to be in the form of a robot.

The cleaning plant in accordance with the invention may comprise a plurality of cleaning stations, wherein each cleaning station has associated therewith at least one manipulating device which picks up a workpiece prior to the treatment in the treatment area of the cleaning station, supplies the workpiece to the treatment process in the treatment area of the cleaning station and passes on the workpiece after the treatment in the treatment area of the cleaning station.

The at least one manipulating device of the cleaning plant can be arranged in a static manner at a cleaning station of the cleaning plant.

As an alternative thereto, it is also possible for the cleaning plant to comprise a manipulating device which is moveable within the cleaning plant between different cleaning stations.

For example, provision could be made for one or more robots to be arranged on a ground rail or on a roof rail such as to be displaceable in a longitudinal direction of the cleaning plant.

In particular, the cleaning plant in accordance with the invention may comprise at least one washing station which comprises a washing vessel in which the workpiece is located during a washing process, wherein the washing vessel has an access opening through which the manipulating device extends into the washing vessel during the washing process.

This access opening can be arranged at the top of the washing vessel in particular.

Furthermore, provision may be made for the cleaning plant to comprises at least one vacuum station which comprises a vacuum container in which the workpiece is located under vacuum during a working process, wherein the vacuum container has an entry opening which is closed during the working process by means of a cover arranged on the manipulating device.

Furthermore, provision may be made for the cleaning plant to comprise a deburring station which comprises at least one spraying lance.

In this case, provision may be made, in particular, for the workpiece to be moved within the treatment area of the deburring station by means of the manipulating device in such a way that a spraying opening of the spraying lance enters a cavity of the workpiece during the spraying process.

Furthermore, provision may be made for at least one cleaning station of the cleaning plant to be arranged in a chamber having a chamber wall and for the cleaning plant to comprise a workpiece moving apparatus, in particular a rotary partition, by means of which the workpiece is movable from one side of the chamber wall to the other side of the chamber wall through a passage opening in the chamber wall In particular, the workpiece moving apparatus may comprise a turntable.

Preferably, provision is made for the workpiece to be held on the manipulating device during the treatment in the treatment area of the cleaning station.

It is particularly expedient, if the workpiece is movable relative to a treatment device of the cleaning station by means of the manipulating device during the treatment thereof in the treatment area of the cleaning station, in particular, in rotary and/or pivotal manner.

Further features and advantages of the invention form the subject matter of the following description and the pictorial illustration of an exemplary embodiment.

BRIEF DESCRIPTION OF THE DRAWINGS

FIG. 29 a schematic perspective illustration corresponding to FIG. 28, after the workpiece has been inserted into the vacuum container and the vacuum container has been closed by means of the cover arranged on the robot arm.

Similar or functionally equivalent elements are designated by the same reference symbols in each of the Figures.

DETAILED DESCRIPTION OF THE INVENTION

Figure 1:
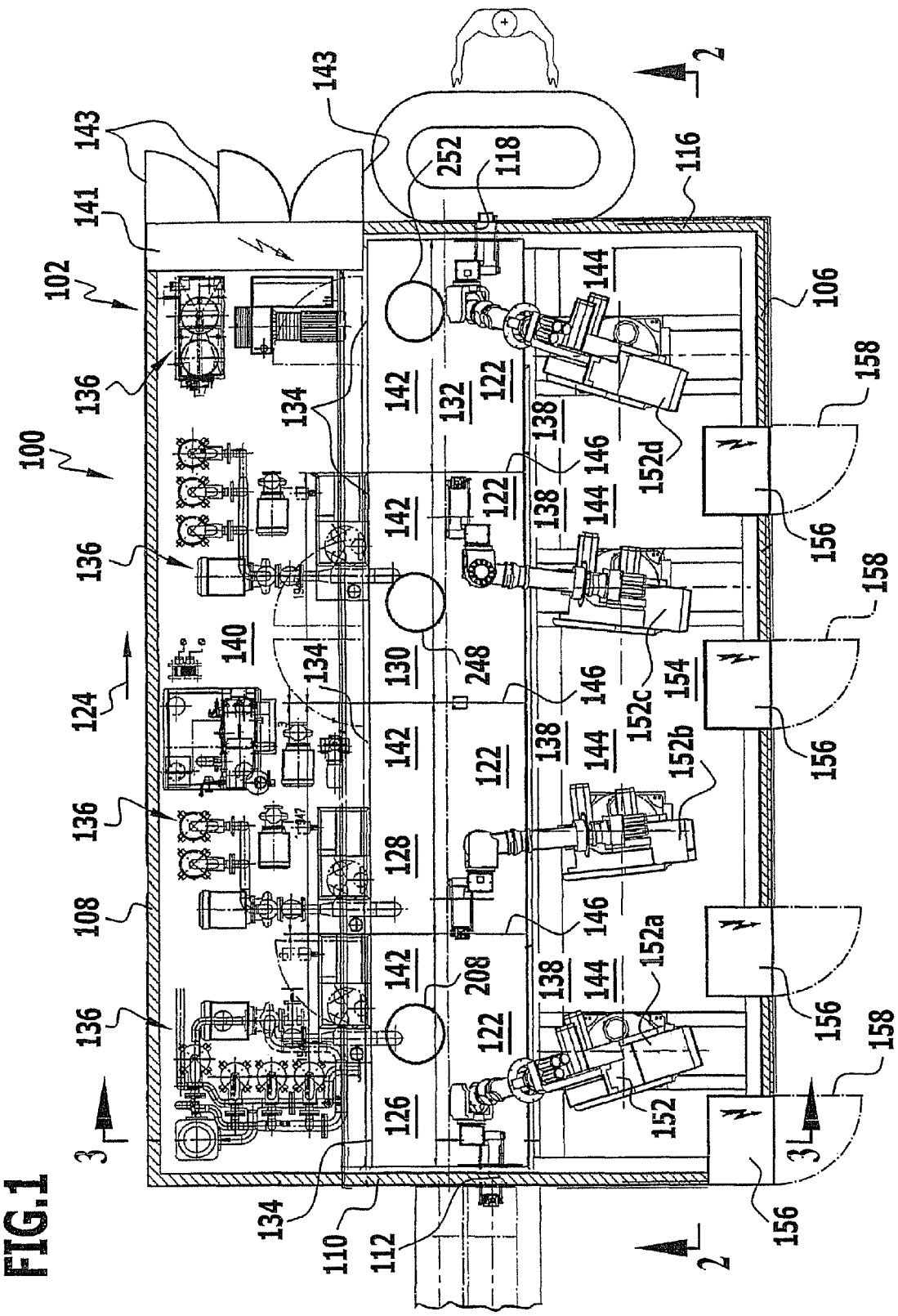
FIG. 1 shows a schematic plan view from above of a cleaning plant having four successive cleaning stations (pre-wash, high pressure deburring, injection flood washing and vacuum-drying) each of which has a manipulating device in the form of a robot associated therewith.
Figure 2:
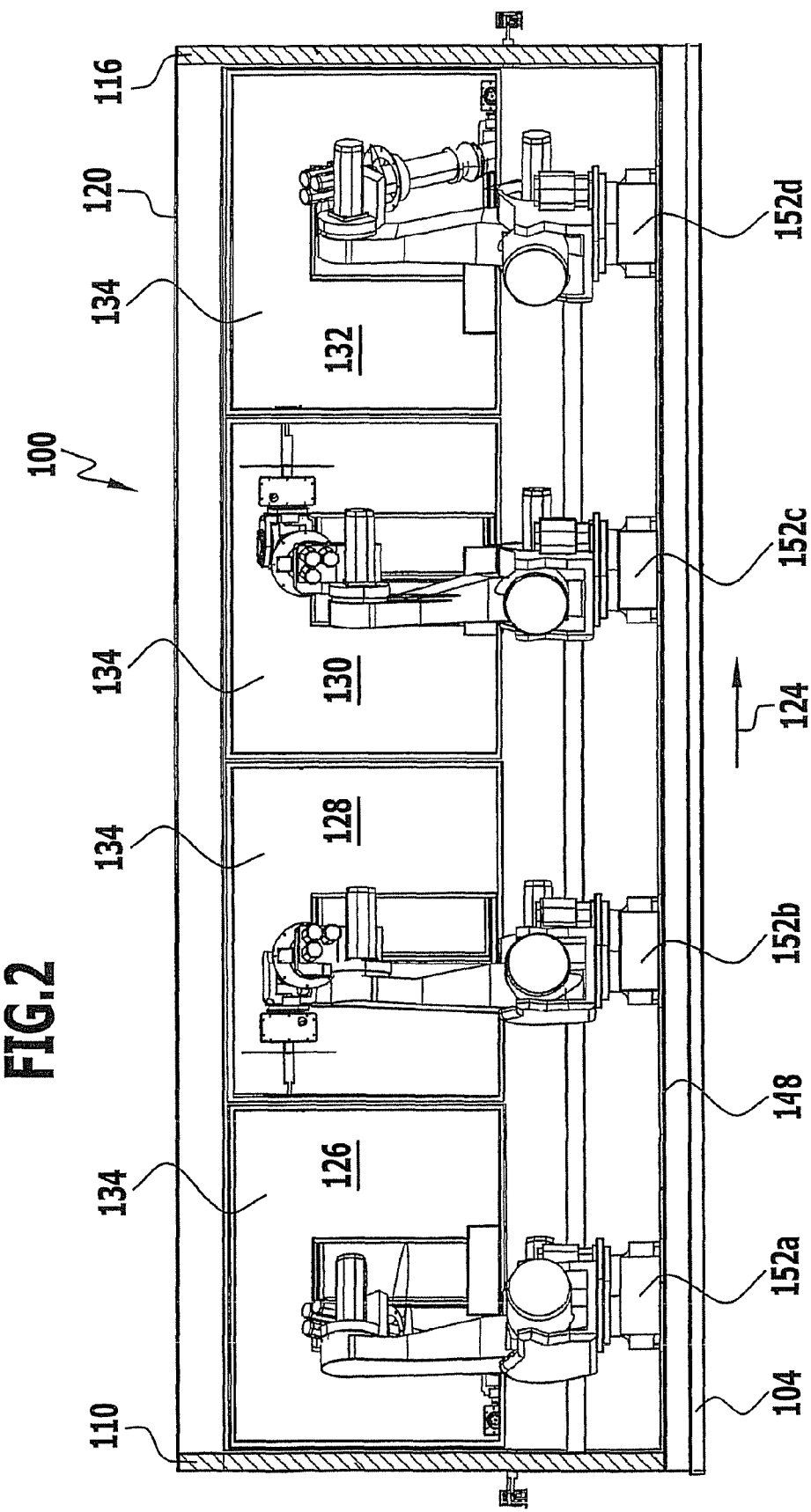
FIG. 2 a schematic longitudinal sectional view of the cleaning plant of FIG. 1 along the line 2-2 in FIG. 1.

A cleaning plant bearing the general reference 100 which is illustrated in FIGS. 1 to 29 comprises a substantially cuboidal housing 102 having a bottom wall 104, a front side wall 106, a rear side wall 108 provided with windows 107, a left input-side side wall 110 incorporating a filling opening 112 for the insertion of a workpiece 114 requiring cleaning into the cleaning plant 100, a right output-side side wall 116 incorporating a withdrawal opening 118 for delivering a work piece that has been cleaned in the cleaning plant 100 and also having a roof wall 120.

The cleaning plant 100 comprises a plurality of, four in the present exemplary embodiment, cleaning stations 122 which succeed one another in the longitudinal direction 124 of the cleaning plant 100 between the input-side side wall 110 and the output-side side wall 116 thereof.

The concretely illustrated embodiment of a cleaning plant 100 comprises in succession from the input to the output sides of the cleaning plant 100, a pre-washing station 126, a high pressure deburring station 128, an injection flood washing station 130 and a vacuum drying station 132.

Each of the cleaning stations 122 is subdivided by a respective vertical partition wall 134 running parallel to the longitudinal direction 124 of the cleaning plant 100 into a maintenance area 136 lying between the partition wall 134 and the rear side wall 108 of the housing 102 and a work area 138 lying between the partition wall 134 and the front side wall 106 of the housing 102.

The supply and processing means that are required for carrying out the treatment on the workpieces 114 in the work area 138, such as cleaning-agent tanks, pumps, filtering devices, cleaning-agent processing plants, vacuum pumps or the like for example, are arranged in the maintenance area 136 of each cleaning station 122.

Together, the maintenance areas 136 of each of the cleaning stations 122 form a continuously traversable maintenance space 140 which extends in parallel with the partition walls 134 in the longitudinal direction 124 of the cleaning plant 100 and is accessible to maintenance personnel from the exterior of the cleaning plant 100 via a (not illustrated) entrance door so that the necessary maintenance work can be carried out in the maintenance space 140 without the treatment of the workpieces 114 in the work areas 138 of the cleaning plant 100 needing to be interrupted for this purpose.

Furthermore a switchgear cabinet 141, which contains controllers and/or power supply devices for the supply and processing means arranged in the maintenance areas 136, is fitted into the side wall 116 of the housing 102 at one end of the maintenance space 140 in such a manner that the doors 143 of the switchgear cabinet 141 can be opened from the exterior of the cleaning plant 100 in order to provide access to the interior of the switchgear cabinet 141.

The work area 138 of each cleaning station 122 comprises a treatment area 142 directly adjacent to the partition wall 134 and a robot standing area 144 extending between the treatment area 142 and the front side wall 106.

The steps of a treatment on the workpieces 114 that are specific to the respective cleaning station 122 are implemented in the treatment area 142 of each cleaning station 122. The construction of the treatment areas 142 in the cleaning stations 122 will be described in more detail hereinafter in the context of the description of the functioning of the cleaning plant 100.

In each partition wall 134, there is provided a pivotal access window 145 through which the respective treatment area 142 is accessible from the respectively associated maintenance area 136 in order to enable maintenance, cleaning and/or repair work to be carried out in the treatment area 142 from the maintenance area 136.

The treatment areas 142 of the cleaning stations 122 following one another in the longitudinal direction 124 are separated from each other by a respective vertical lateral partition wall 146 running perpendicularly to the longitudinal direction 124.

The robot support zone 144 of each cleaning station 122 has a base formed by a grating 148 (see FIG. 9) which supports a respective pedestal 150 for a robot 152 serving as a manipulating device.

The robot support zones 144 of each of the cleaning stations 122 are not separated from each other by partition walls, but together, they form a continuously traversable robot support space 154 for the cleaning plant 100.

The robot support space 154 is accessible to maintenance personnel from the exterior of the cleaning plant 100 via a (not illustrated) access door.

Arranged next to the pedestal 150 of each robot 152, there is a robot services cabinet 156 which is inserted into the front side wall 106 of the housing 102 of the cleaning plant 100 in such a way that a front door 158 of the robot services cabinet 156 can be opened from the exterior of the cleaning plant 100 in order to gain access to the robot services cabinet 156 and carry out any programming, maintenance and/or repair work that has become necessary.

Figure 3:
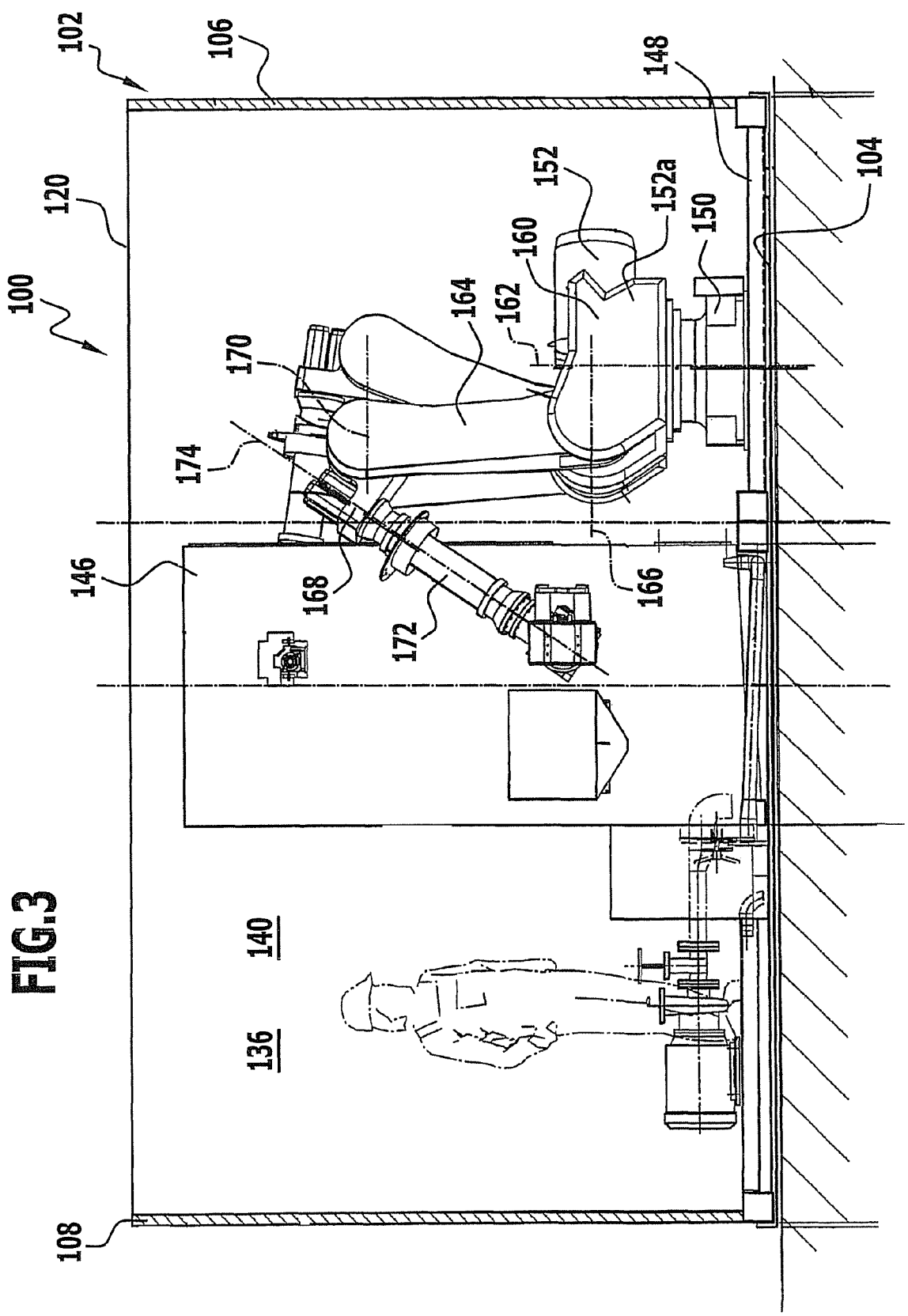
FIG. 3 a schematic cross sectional view of the cleaning plant of FIG. 1 along the line 3-3 in FIG. 1.
Figure 4:
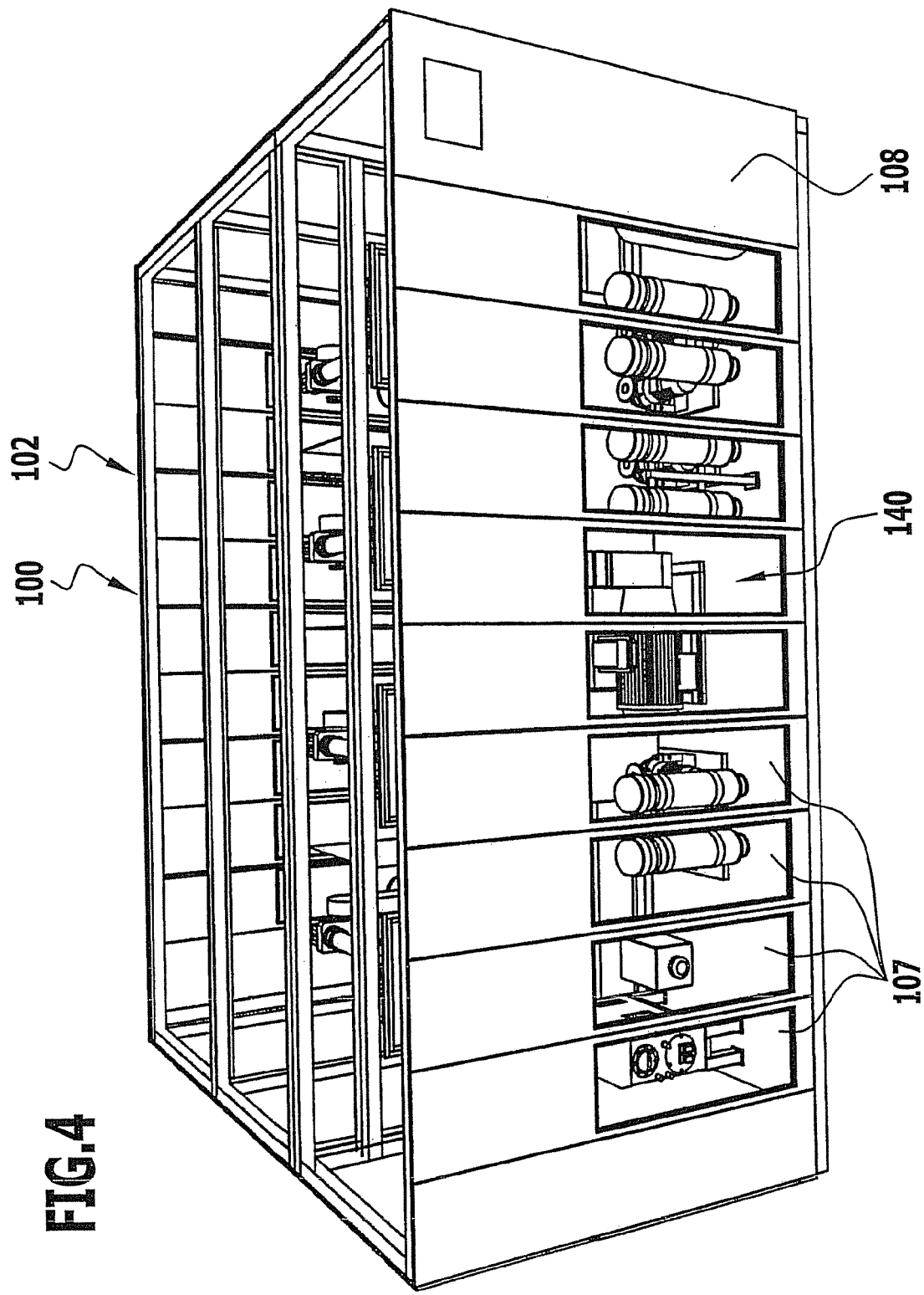
FIG. 4 a schematic perspective illustration of the cleaning plant with its roof wall removed as seen from the rear.
Figure 5:
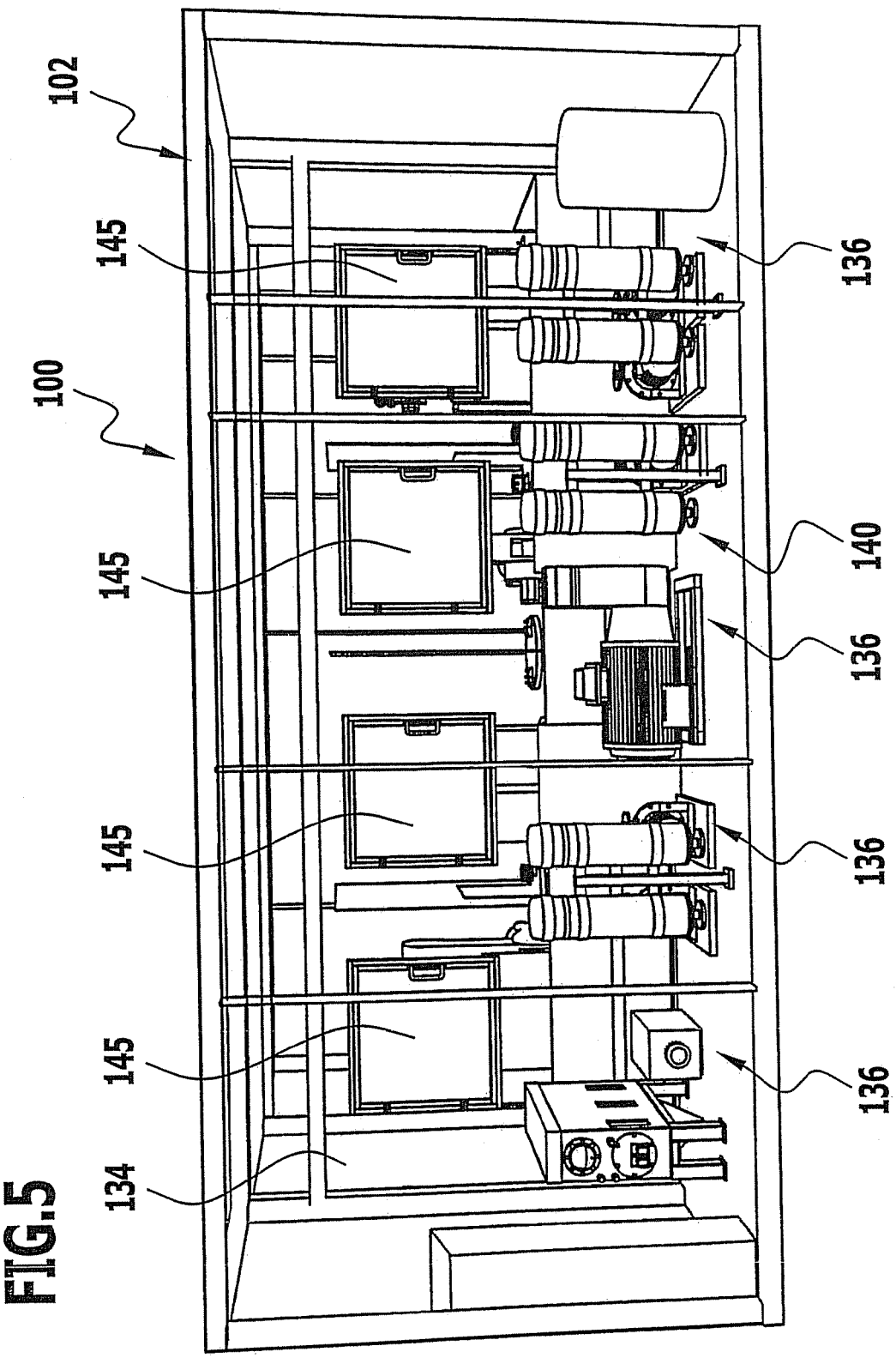
FIG. 5 a schematic perspective illustration of the cleaning plant with its rear wall removed as seen from the rear.
Figure 6:
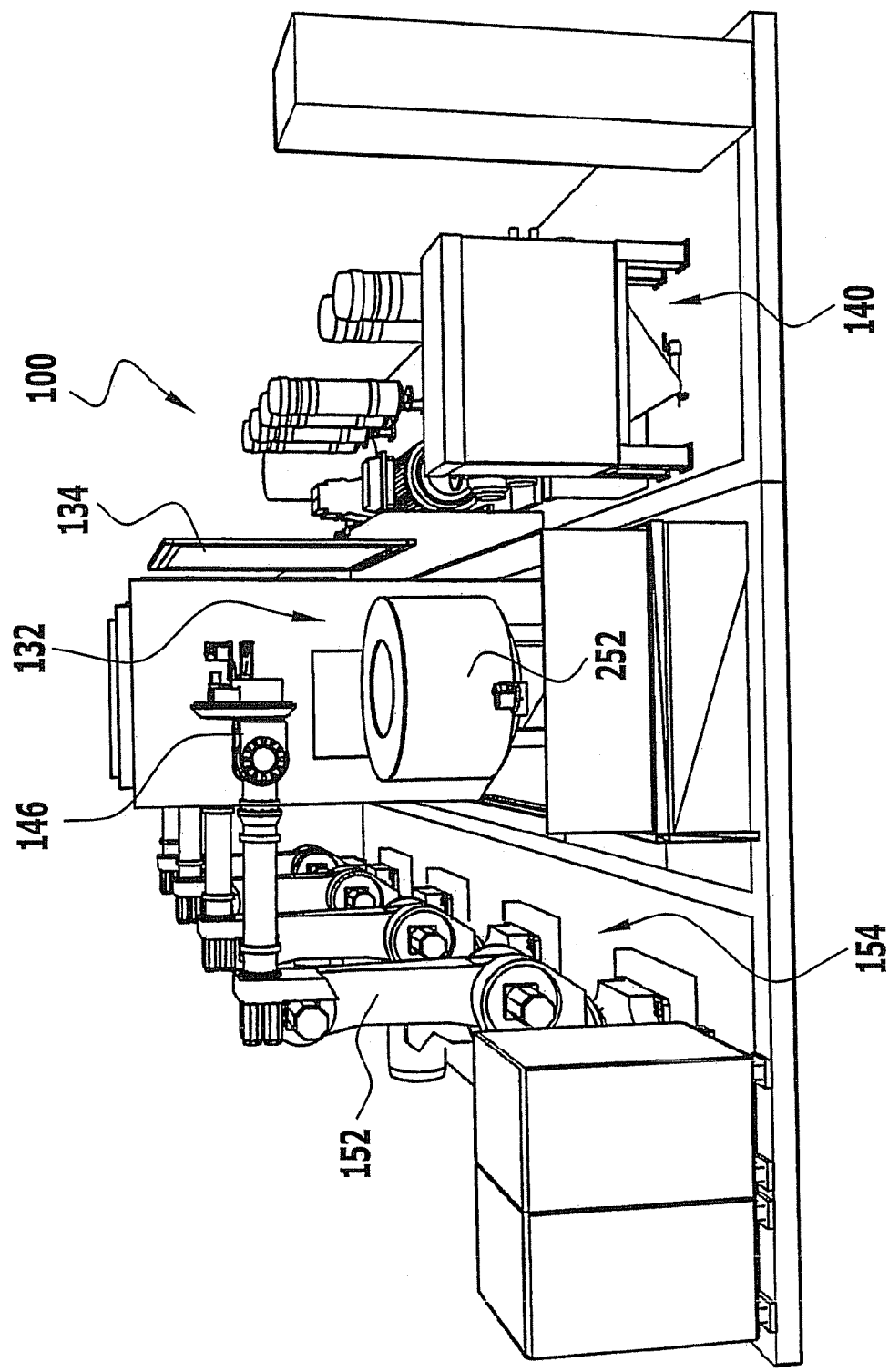
FIG. 6 a schematic perspective illustration of the cleaning plant with the side walls and the roof wall thereof removed as seen from the output side of the cleaning plant.
Figure 7:
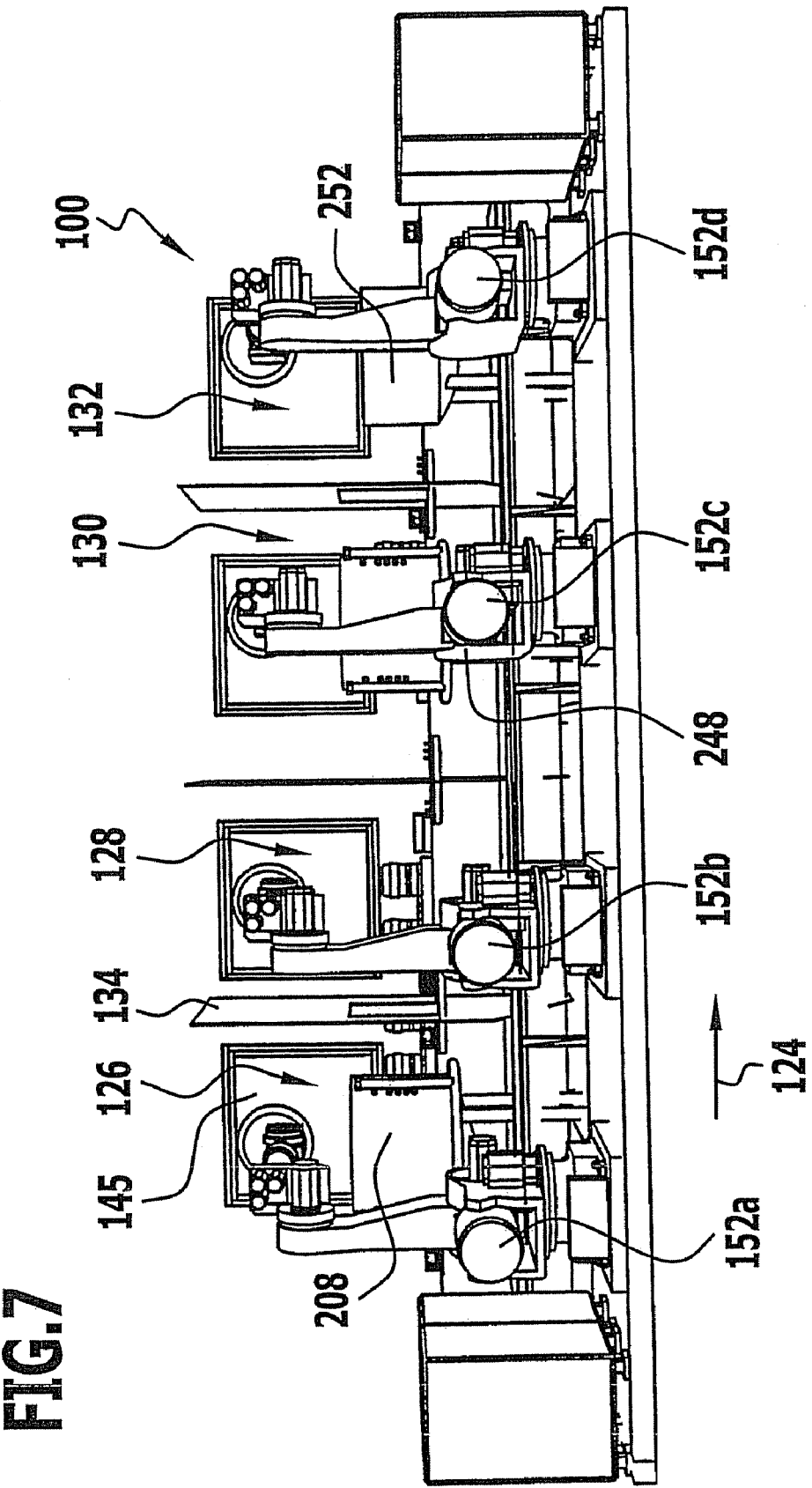
FIG. 7 a schematic perspective illustration of the cleaning plant with the side walls and the roof wall thereof removed as seen from the front side of the cleaning plant.
Figure 8:
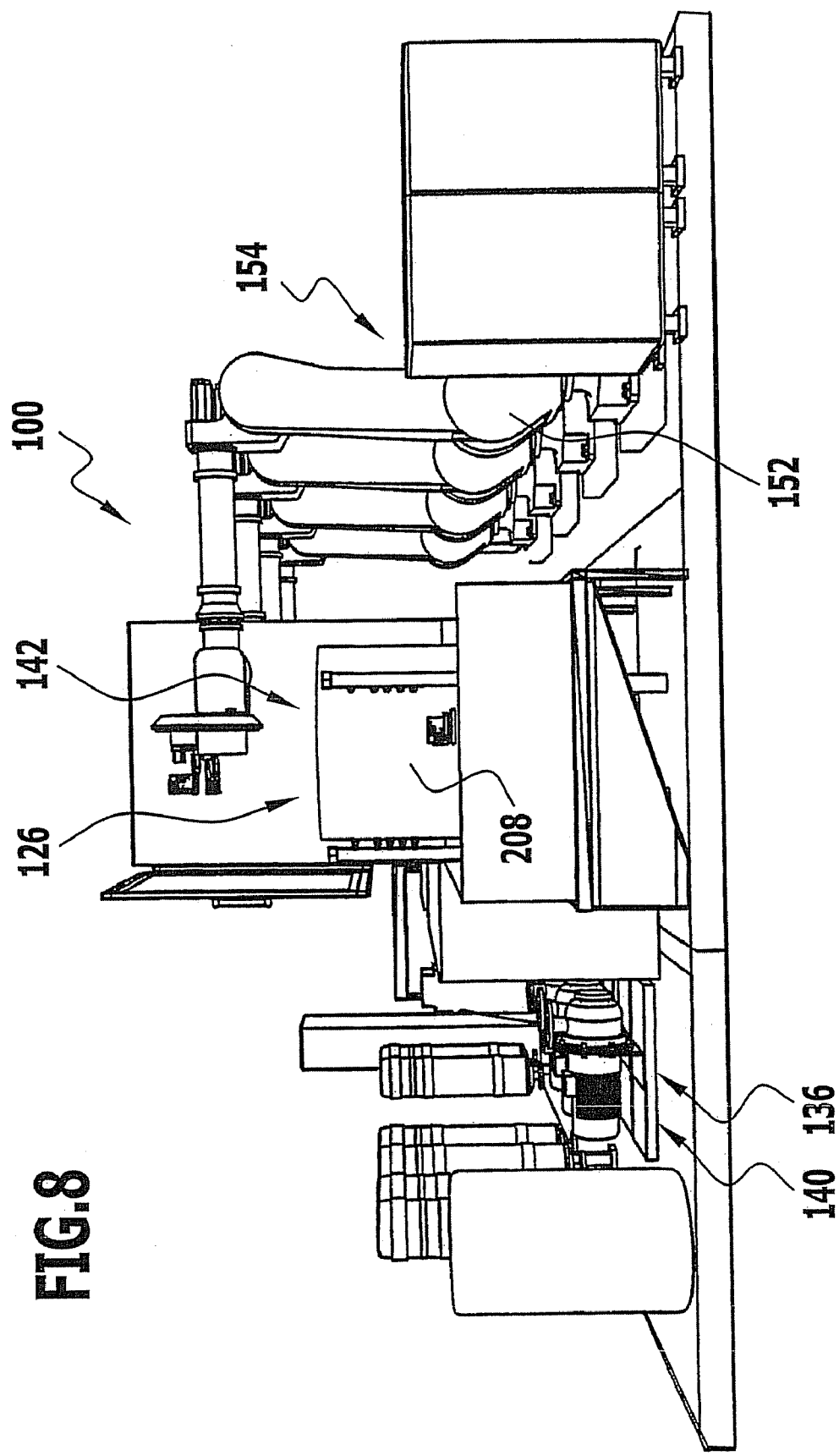
FIG. 8 a schematic perspective illustration of the cleaning plant with the side walls and the roof wall thereof removed as seen from the input side of the cleaning plant.

As can be seen from FIG. 3 for example, each of the respective robots 152 has at least six axes of rotation, about which parts of the robot 152 are moveable relative to each other by means of suitable rotary or pivotal drives under the control of a (not illustrated) control system for the robot 152.

Thus, a base part 160 of each robot is arranged on the pedestal 150 and is rotatable relative to the pedestal 150 about a vertical first axis of rotation 162 (see FIG. 3).

A main arm 164 of the robot 152 is held on the base part 160 and is pivotal relative thereto about a horizontal second axis of rotation 166.

An angular retaining part 168 is arranged on the main arm 164 and is pivotal relative thereto about a horizontal third axis of rotation 170.

Figure 10:
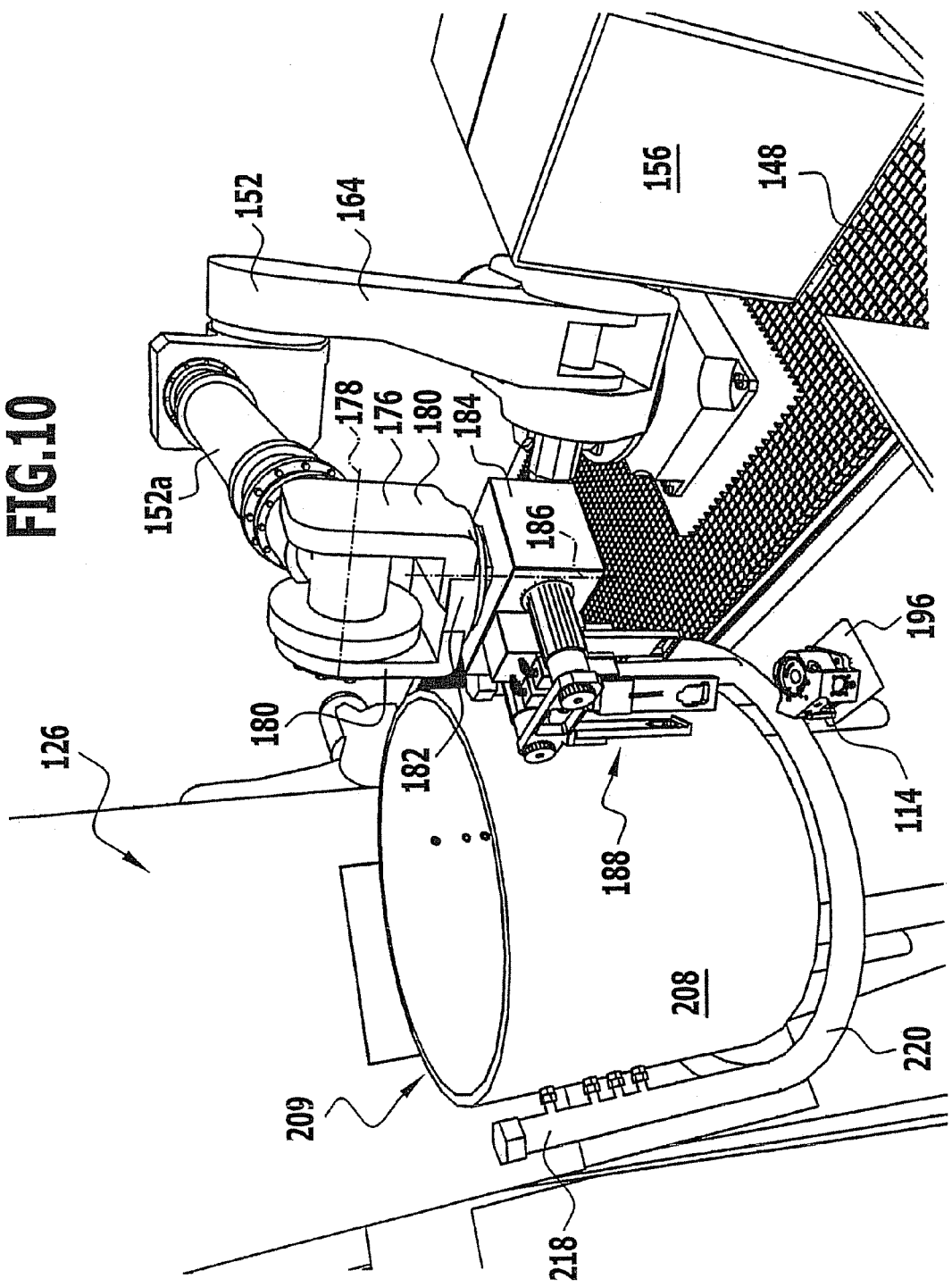
FIG. 10 an illustration of the pre-washing station corresponding to FIG. 9, wherein a gripping device of the robot is moving towards the workpiece.

The retaining part 168 forms a bearing for a rotary arm 172 which is arranged such as to be rotatable relative to the retaining part 168 about its longitudinal axis, the fourth axis of rotation 174 (see FIG. 10).

The free end of the rotary arm 172 remote from the retaining part 168 carries a substantially U-shaped stirrup part 176 which is arranged such as to be pivotal relative to the rotary arm 172 about a fifth axis of rotation 178 running substantially perpendicularly to the fourth axis of rotation 174.

The web 182 interconnecting the two mutually parallel legs 180 of the U-shaped stirrup part 176 carries a robot head 184 on the outer side thereof remote from the fifth axis of rotation 178, said robot head 184 being arranged on the stirrup part 176 such as to be rotatable relative thereto about a sixth axis of rotation 186 running radially relative to the fifth axis of rotation 178.

Arranged on a side face 188 of the substantially cuboidal robot head 184, there is a gripping device 188 which comprises a gripper 190 that is static relative to the robot head 184 (see FIG. 11) and two moveable grippers 194 that are displaceable relative to the robot head 184 by means of a respective displacement device 192.

The displacement devices 192 can be in the form of (hydraulic or pneumatic) two-way cylinders or else electrically operable spindle nut/spindle mechanisms for example.

The static gripper 190 and the moveable grippers 194 of the gripping device 188 are provided with recesses and/or with projections of a type such that the workpiece 114 will be held positively between the grippers 190, 192 when the gripping device 188 is closed.

The cleaning process that is carried out with the previously described cleaning plant 100 is described in detail hereinafter with reference to FIGS. 9 to 29, wherein the individual components in the treatment areas 142 of the four cleaning stations 122 of the cleaning plant 100 are also described at the same time:

After the workpiece 114 requiring treatment has been inserted into the pre-washing station 126 of the cleaning plant 100 through the filling opening 112, the workpiece 114 is initially located on a workpiece retaining plate 196 having four positioning pins 198 extending upwardly from the upper surface thereof (see FIG. 12), said pins entering corresponding recesses in the workpiece 114 so that the workpiece 114 is held securely on the workpiece retaining plate 196 and cannot be displaced in the horizontal direction.

Figure 9:
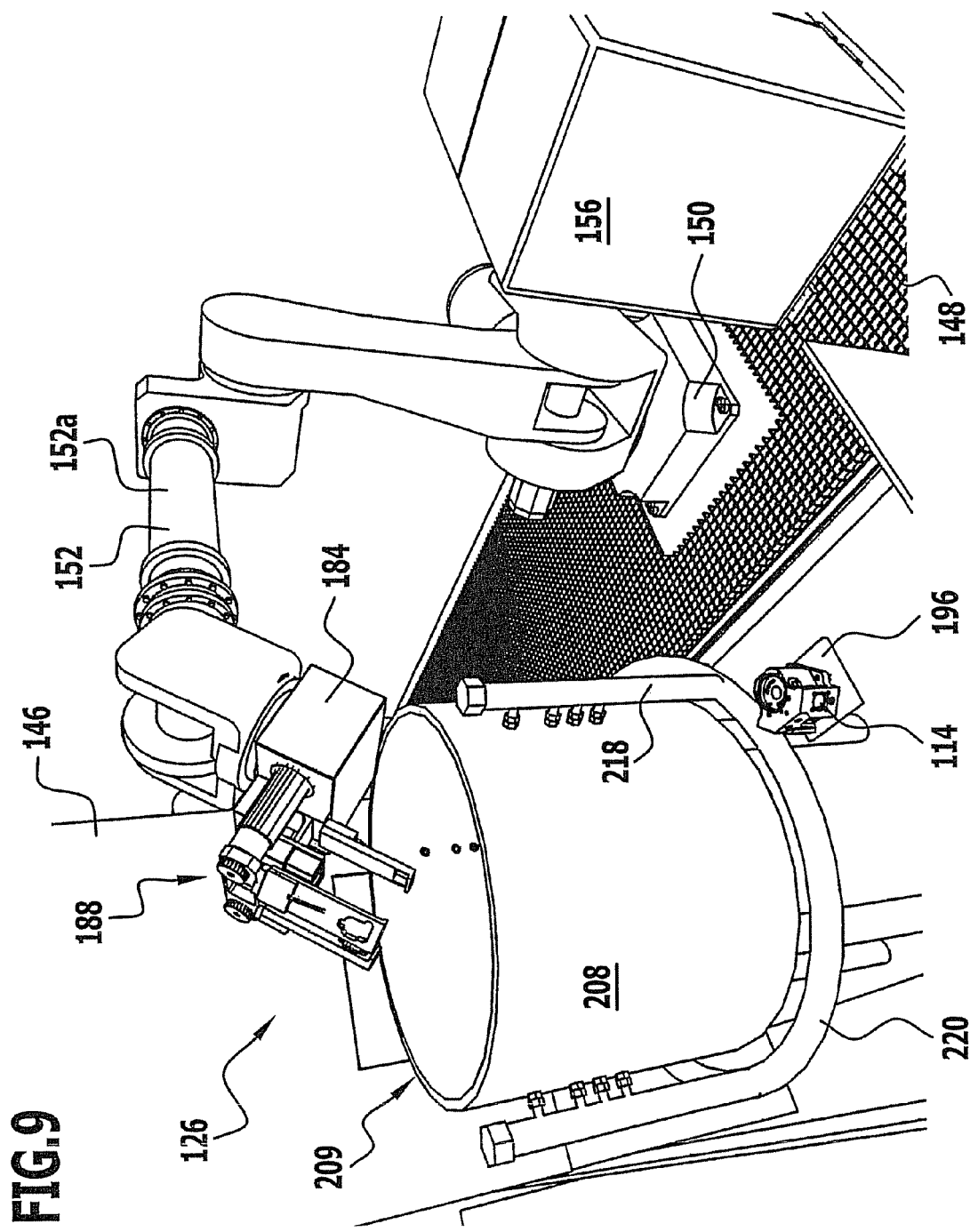
FIG. 9 a schematic perspective illustration of a pre-washing station of the cleaning plant with a pre-washing vessel, a robot and a workpiece requiring pre-washing.
Figure 11:
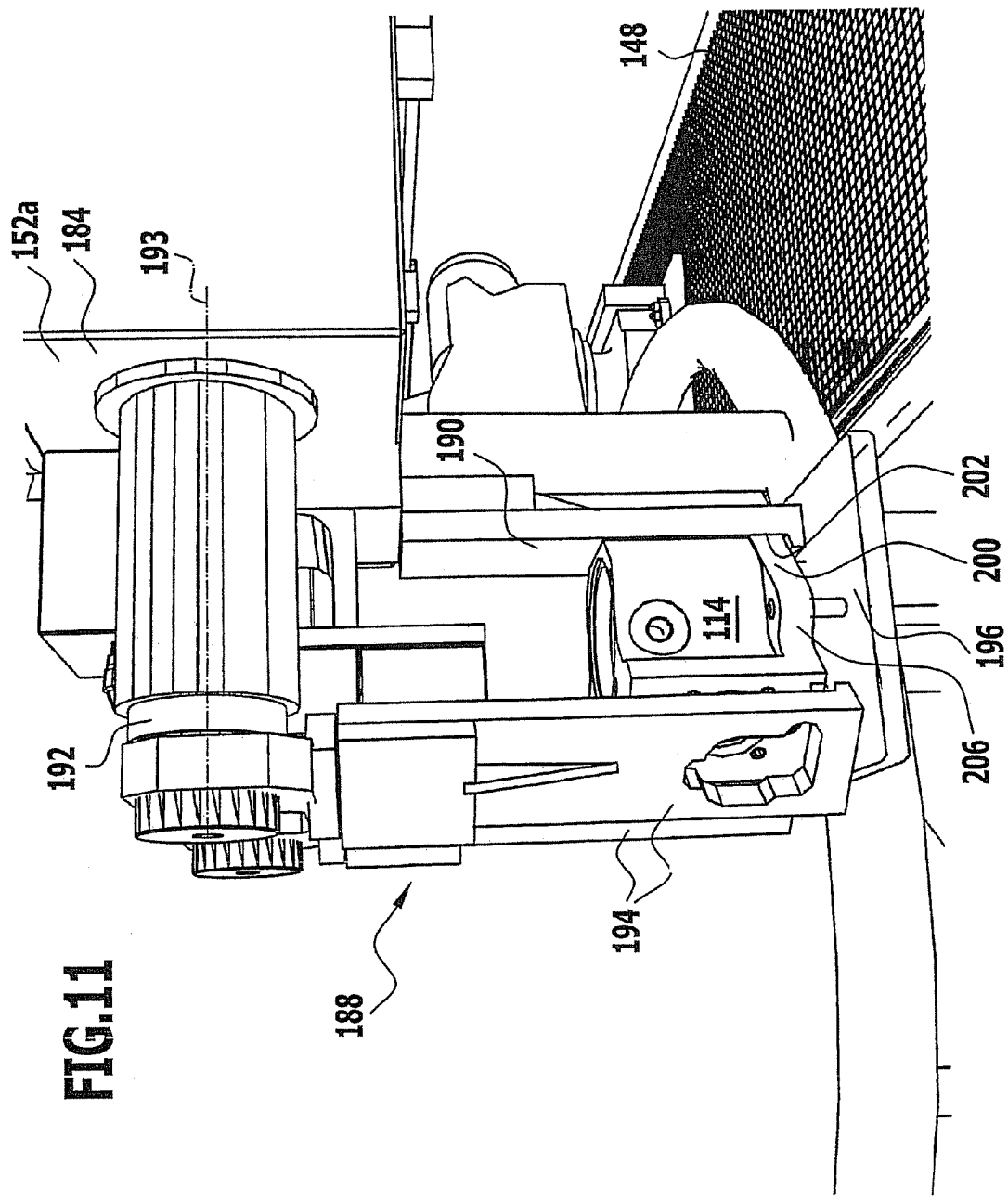
FIG. 11 a schematic perspective illustration of the workpiece and the gripping device of the robot, prior to the workpiece being grasped by the gripping device.

For the purposes of picking up the workpiece 114 by the first robot 152a, the rotary and pivotal drives of the robot 152a are actuated by the robot's automatic control system in such a manner that the gripping device 188 of the robot 152a is moved from the position illustrated in FIG. 9 through the position illustrated in FIG. 10 into the position illustrated in FIG. 11 wherein the grippers 190, 194 of the gripping device 188 are aligned substantially vertically and the workpiece 114 that is to be picked up is surrounded on three sides.

In the position shown in FIG. 11, the workpiece 114 is picked up by the holding device 188 of the robot 152a, in that the gripper 190 which is static with respect to the robot head 184 is moved towards the workpiece 114 by a substantially horizontal movement of the robot head 184 in the radial direction so that a projection 200 of the workpiece 114 enters a seating opening 202 in the static gripper 190, and also in that the two moveable grippers 194 are moved towards the workpiece 114 by the displacement device 192 in the direction of displacement 193 thereof so that projections 204 disposed at the lower end of the moveable grippers 194 are then located below a base plate 206 of the workpiece 114.

Figure 12:
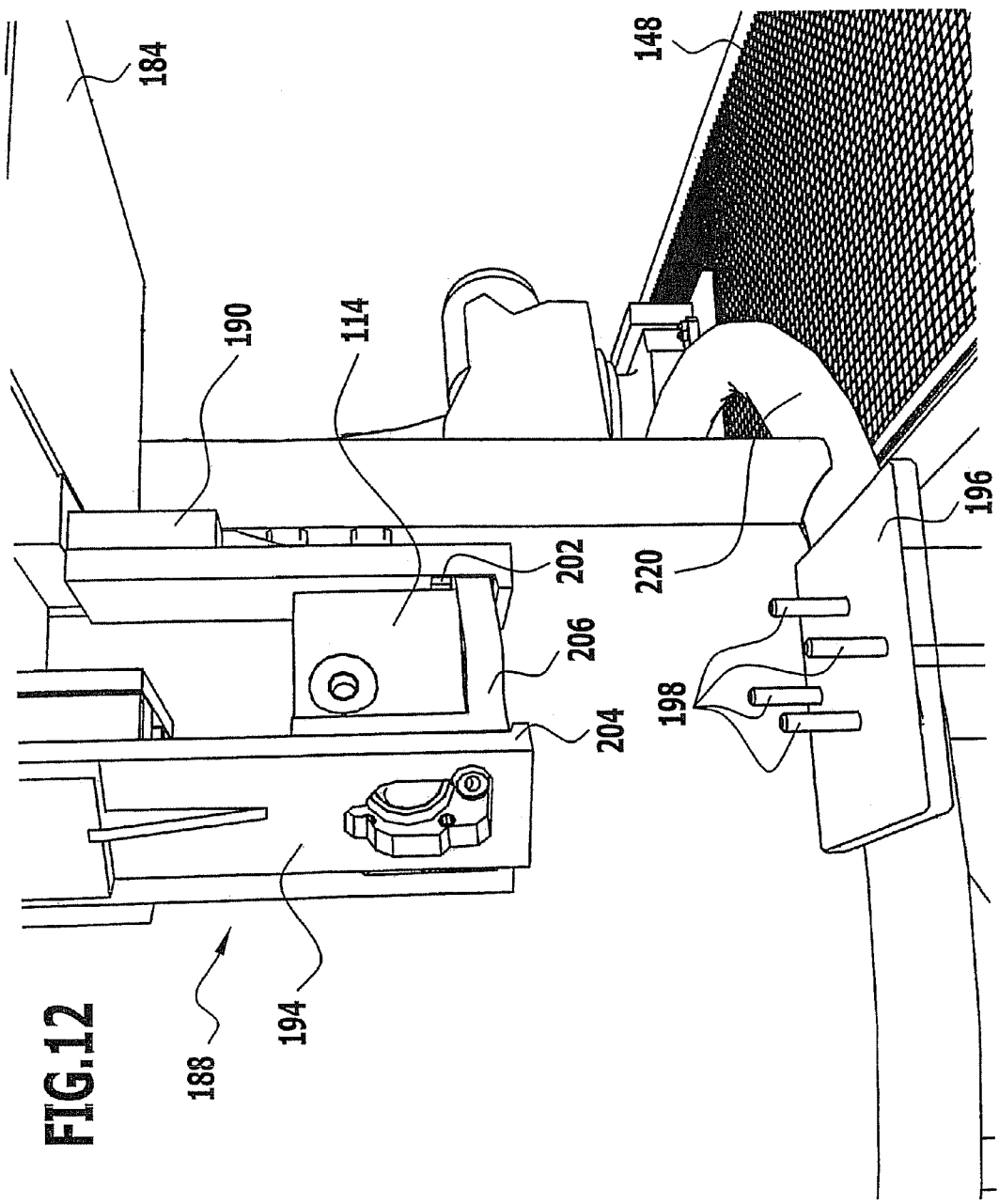
FIG. 12 a schematic perspective illustration corresponding to FIG. 11, after the workpiece has been grasped by the gripping device of the robot and after the workpiece has been lifted from a workpiece retaining means.

Due to the displacement of the moveable grippers 194, the gripping device 188 is transferred from the open position illustrated in FIG. 11 into the closed position illustrated in FIG. 12 wherein the workpiece 114 is held in positive manner by the gripping device 188

Figure 13:
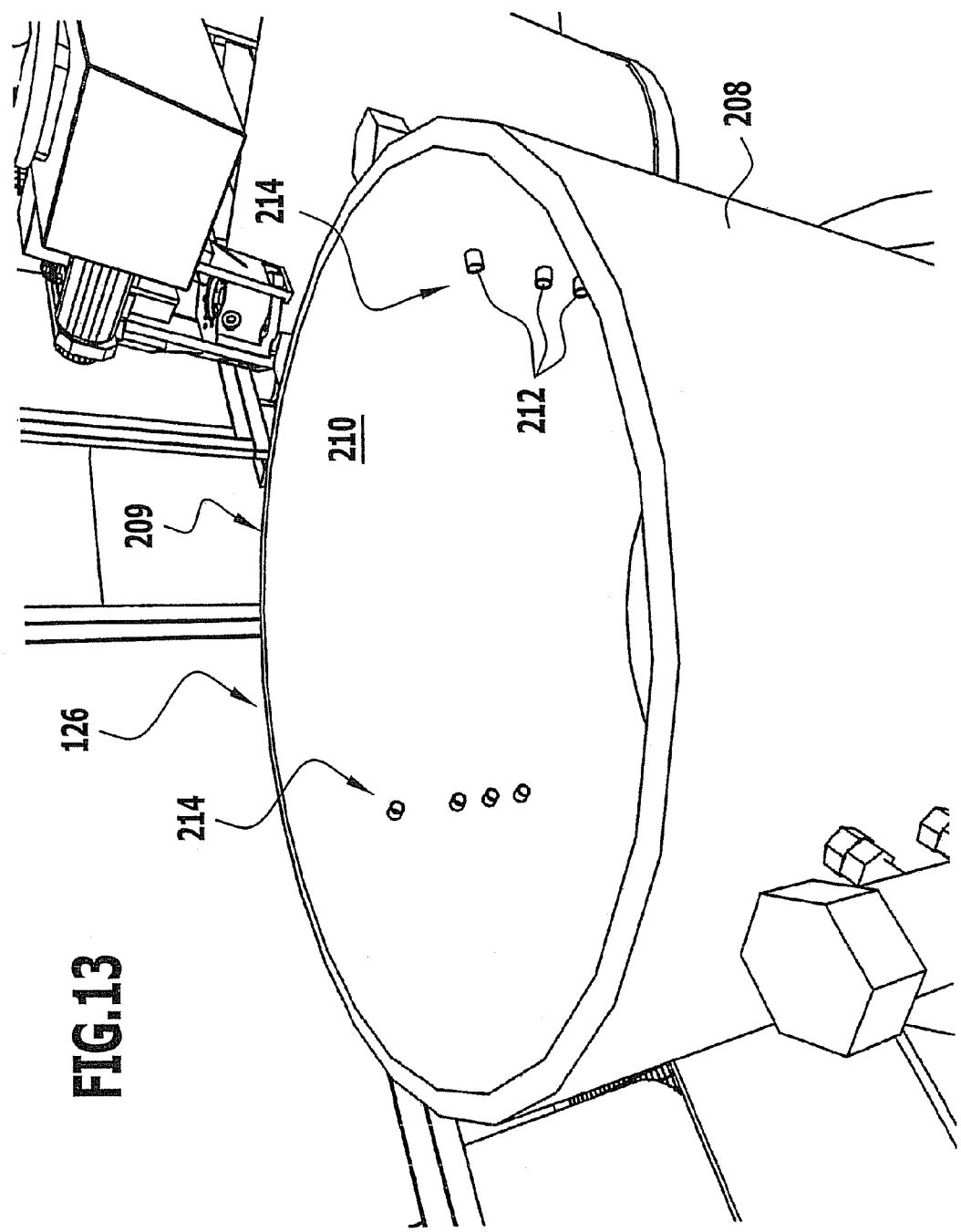
FIG. 13 a schematic perspective illustration of the pre-washing vessel in the pre-washing station with the spraying nozzles arranged on the inner wall of the pre-washing vessel.
Figure 14:
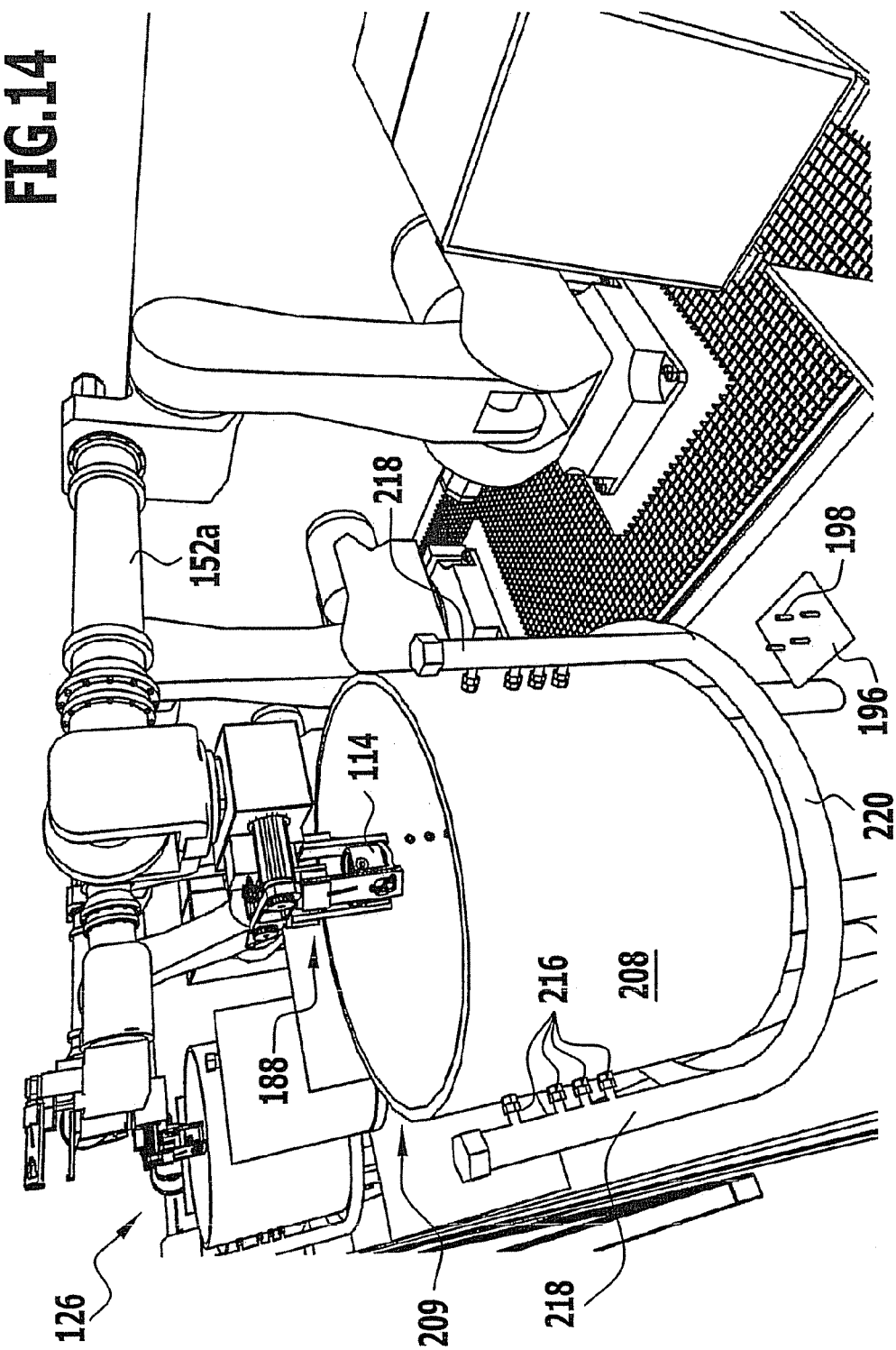
FIG. 14 a schematic perspective illustration of the pre-washing station, wherein the workpiece held by the gripping device is just being inserted into the pre-washing vessel from above.
Figure 15:
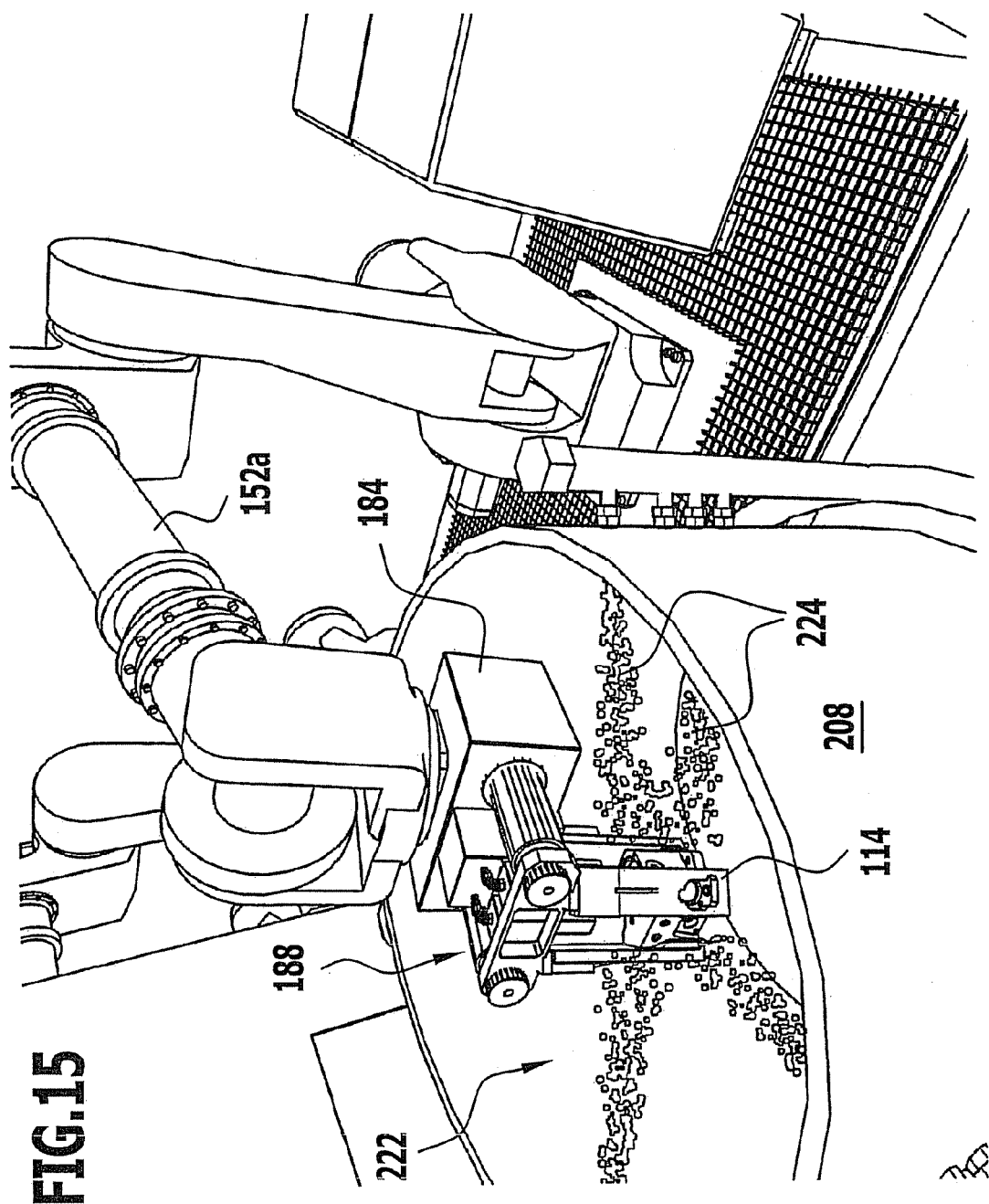
FIG. 15 a schematic perspective illustration of the pre-washing station during a pre-washing process, wherein the workpiece is subjected to jets of a pre-washing liquid by the spraying nozzles and is moved relative to the spraying nozzles by the robot during this process.

After this action of closing the gripping device 188, the workpiece 114 is lifted upwardly from the workpiece retaining plate 196 and is inserted, from above, through an access opening 209 into an upwardly open, substantially cup-shaped pre-washing vessel 208 of the pre-washing station 126 by controlling the rotary and pivotal drives of the robot 152a in a suitable manner (see FIGS. 12 to 14).

The pre-washing vessel 208 has a conically upwardly diverging side wall 210 upon the inner surface of which there are provided several spraying nozzles 212 that are formed into a plurality of, three for example, groups of spraying nozzles 214.

Each of the groups of spraying nozzles 214 comprises a plurality of, four for example, spraying nozzles 212 which are arranged one above the other such as to be vertically spaced along a surface line of the side wall 210.

The groups of spraying nozzles 214 themselves are distributed substantially equidistantly around the circumference of the side wall 210, thus for example, at an angular spacing of 120°.

As can best be seen from FIG. 14, the spraying nozzles 212 of each group of spraying nozzles 214 are connected by branch lines 216 to a respective supply line for a group of nozzles 218, and for their part, these group supply lines are connected to a ring line 220.

A liquid pre-washing agent is supplied under pressure to the ring line 220 via a (not illustrated) supply line from a tank arranged in the maintenance area 136 of the pre-washing station 126 by means of a positive-displacement pump which is likewise arranged in the maintenance area 136 of the pre-washing station 126 as soon as a (not illustrated) non-return valve in the supply line to the ring line 220 is opened.

The opening of this non-return valve takes place as soon as the workpiece 114 has been inserted into the interior 222 of the pre-washing vessel 208 so that each spraying nozzle 212 produces a jet of pre-washing agent 224 which is directed towards the vertical central axis of the pre-washing vessel 208.

These fluid jets strike the workpiece 114 and loosen any impurities adhering thereto.

In order to obtain a satisfactory pre-washing effect, the workpiece 114 is moved relative to the jets of pre-washing agent 224 within the effective range of these jets of pre-washing agent 224 by appropriate actuation of the rotary and pivotal drives of the robot 152a in such a manner that all the externally accessible surfaces of the workpiece, and even the surfaces of any cavities in the workpiece 114, are directly exposed to the jets of pre-washing agent 224.

The pre-washing agent running off the workpiece 114 collects at the base of the pre-washing vessel 208, and from there it is supplied via a (not illustrated) drain to a filtration process for subsequent re-usage.

At the end of the pre-determined pre-washing time, the non-return valve in the supply line to the ring line 220 is closed so that the jets of pre-washing agent 224 shut off.

After a subsequent dripping-off phase that is provided when necessary, the workpiece 114 is passed on to the next cleaning station 122 by the robot 152a, in this case, to the high pressure deburring station 128.

The rotary partition 226 that is illustrated in FIGS. 16 to 19 and is arranged in the lateral partition wall 146 between the pre-washing station 126 and the high pressure deburring station 128 serves to effect this transfer.

This rotary partition 226 comprises a substantially circular disk-shaped turntable 228 which carries a vertical central wall 230 on its upper surface, said wall extending in the radial direction of the turntable 228 over the entire diameter thereof so that the central wall 230 divides the upper surface of the turntable 228 into two workpiece seating regions 232, of which only one is illustrated in FIGS. 16 to 19.

A respective workpiece retaining plate 196 of the type previously described above is arranged in each workpiece seating region 232 of the turntable 228.

Figure 16:
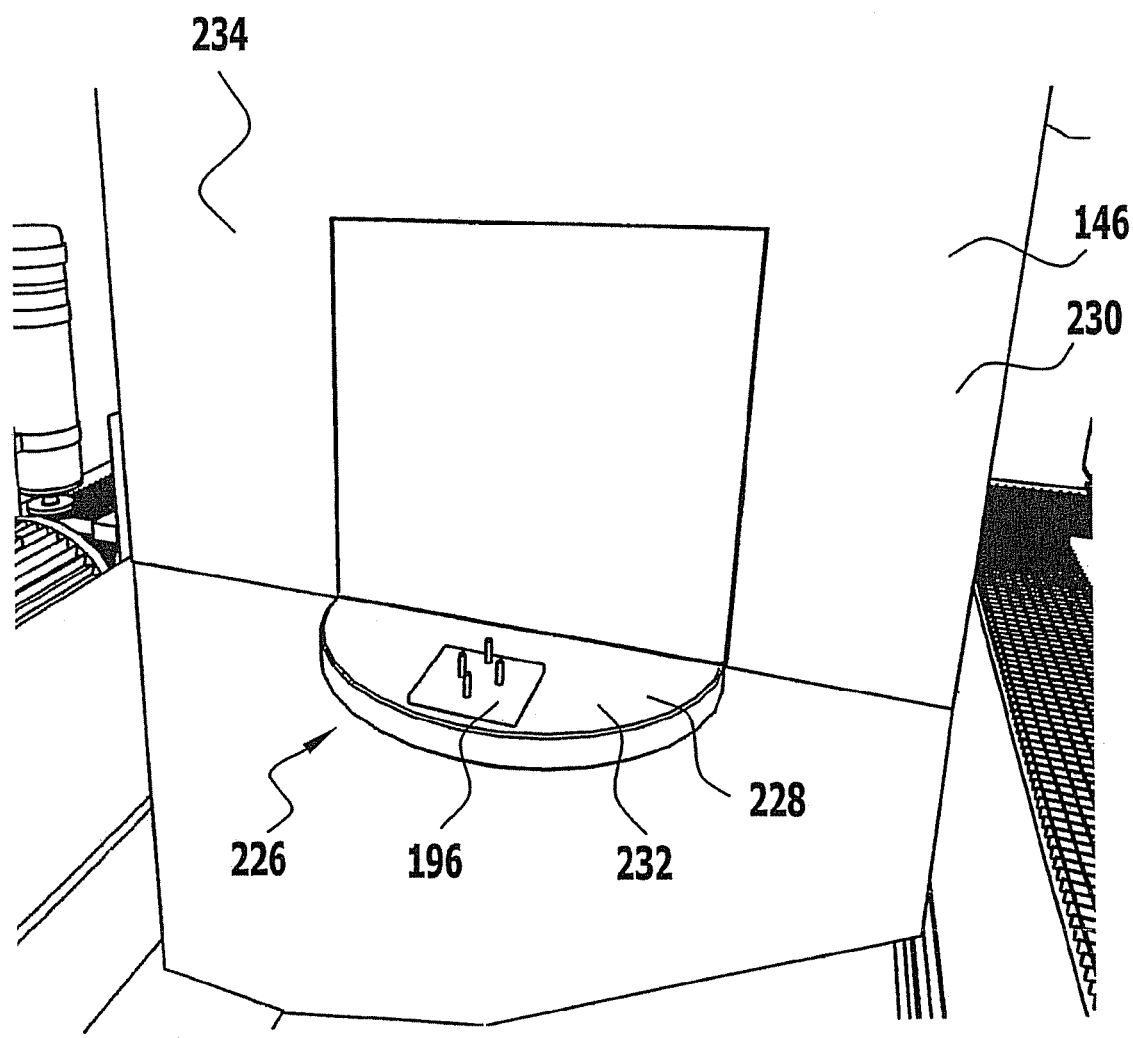
FIG. 16 a schematic perspective illustration of a partition wall between two cleaning stations of the cleaning plant with a rotary partition and an empty workpiece retaining means arranged on the rotary partition.

In the rest position of the workpiece transfer channel 226 illustrated in FIG. 16, the workpiece seating region 232 protruding into the pre-washing station 126 is empty, i.e. it is not occupied by a workpiece 114, and the central wall 230 closes a substantially rectangular passage opening in the lateral partition wall 146 which is associated with the rotary partition 226.

Figure 17:
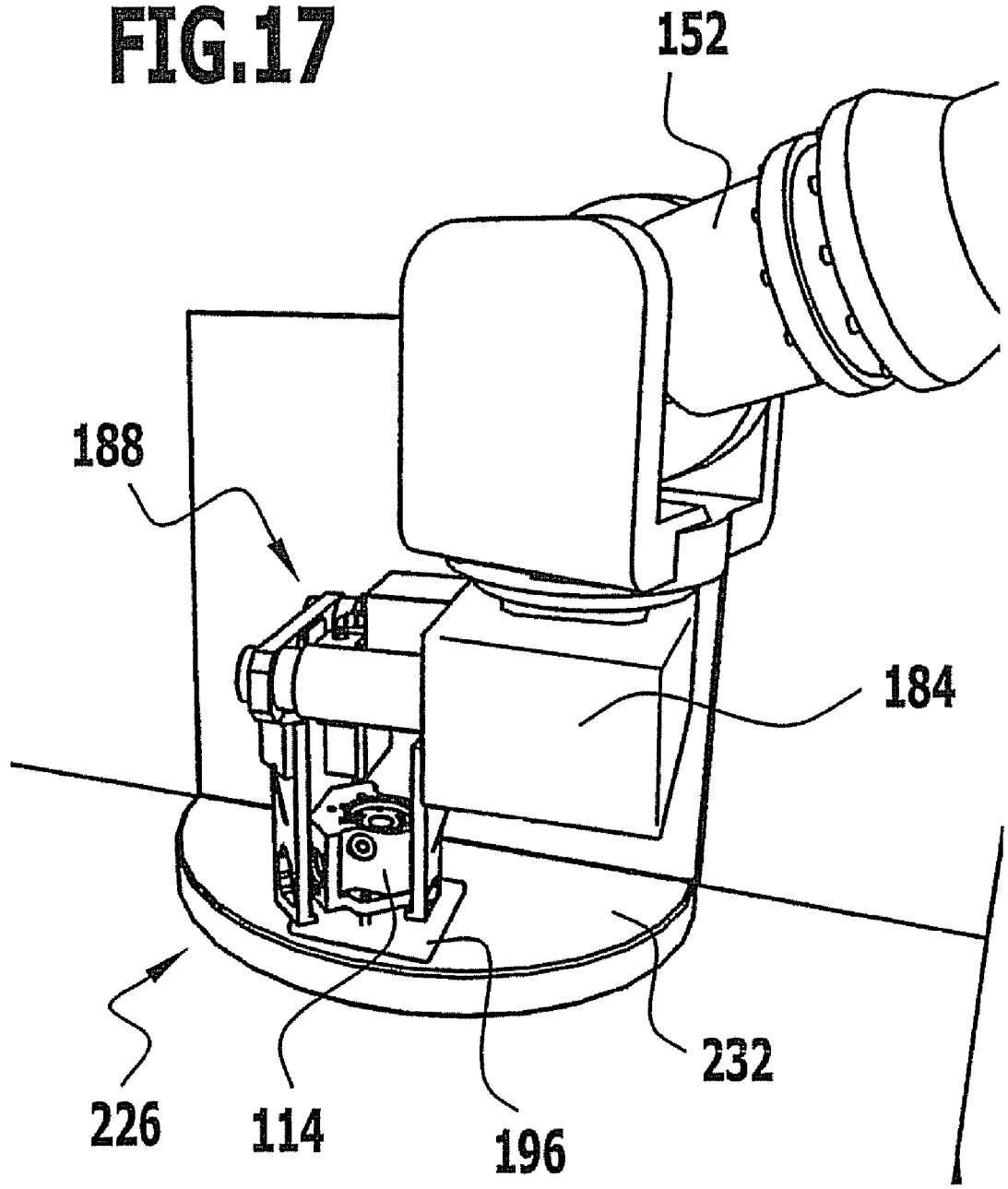
FIG. 17 a schematic perspective illustration of the rotary partition of FIG. 16, wherein a workpiece has just been placed on the workpiece retaining means by means of a robot.
Figure 18:
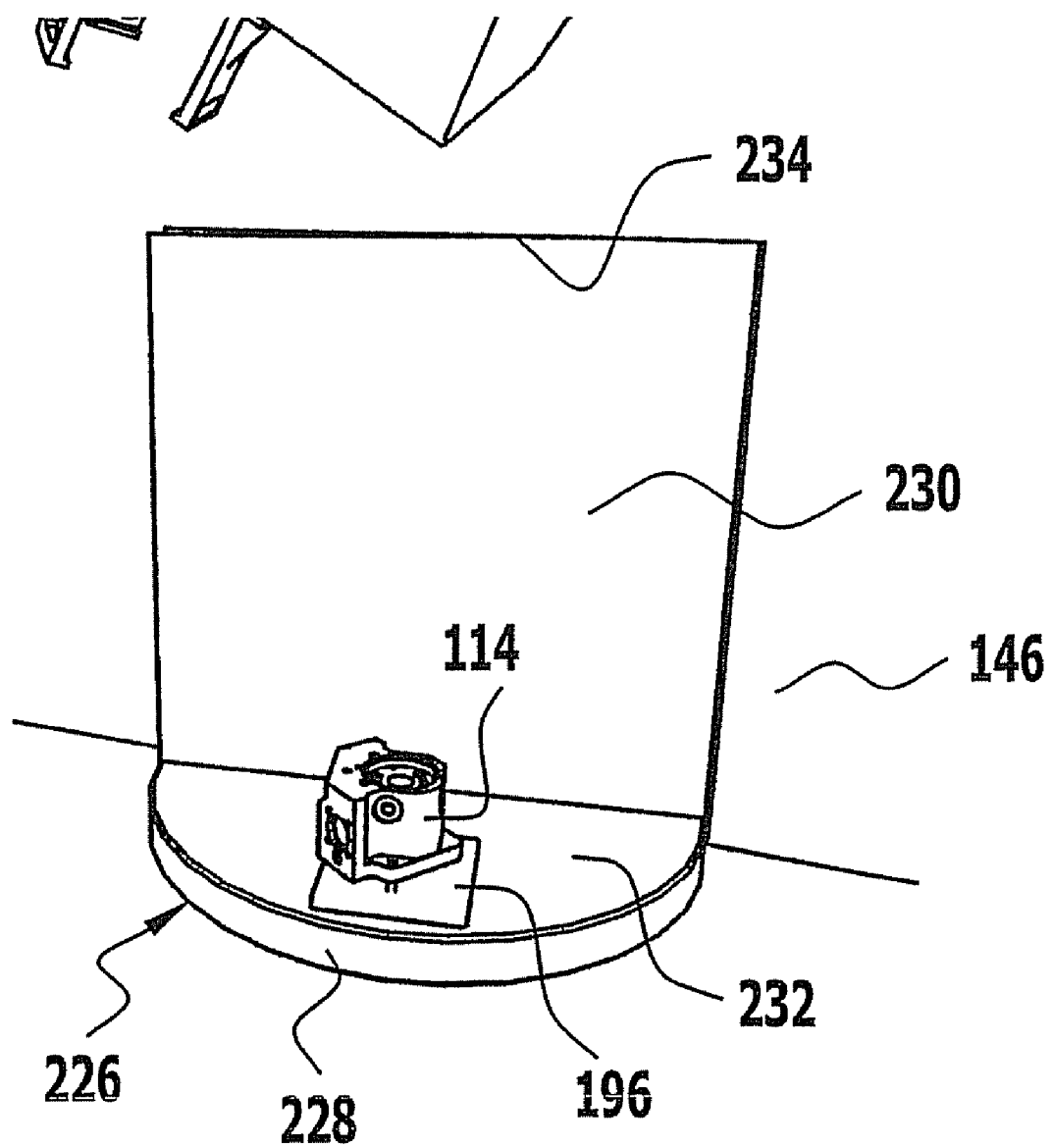
FIG. 18 a schematic perspective illustration of the rotary partition with a workpiece seated on the workpiece retaining means.
Figure 19:
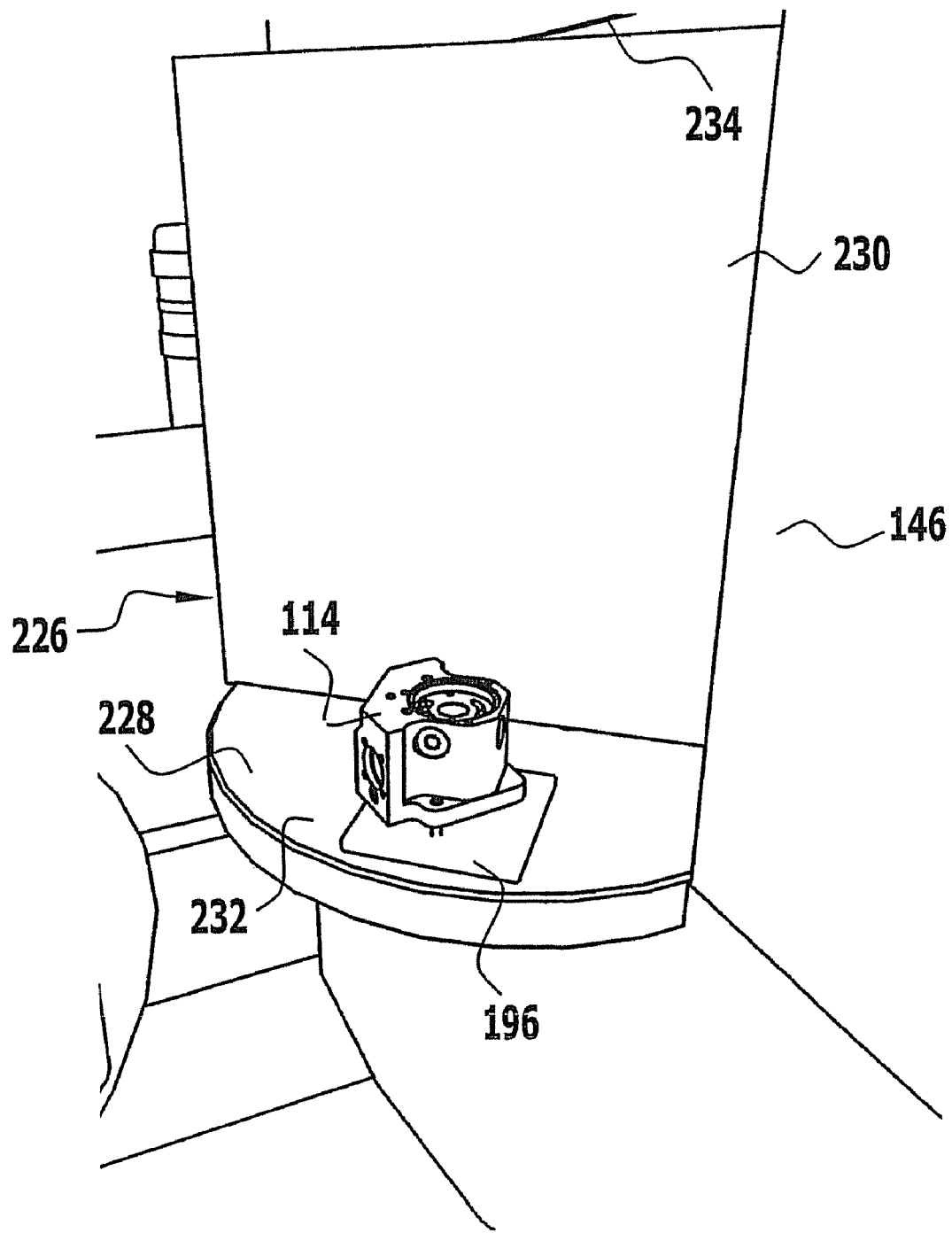
FIG. 19 a schematic perspective illustration of the rotary partition whilst the rotary partition is being rotated about a vertical axle.
Figure 20:
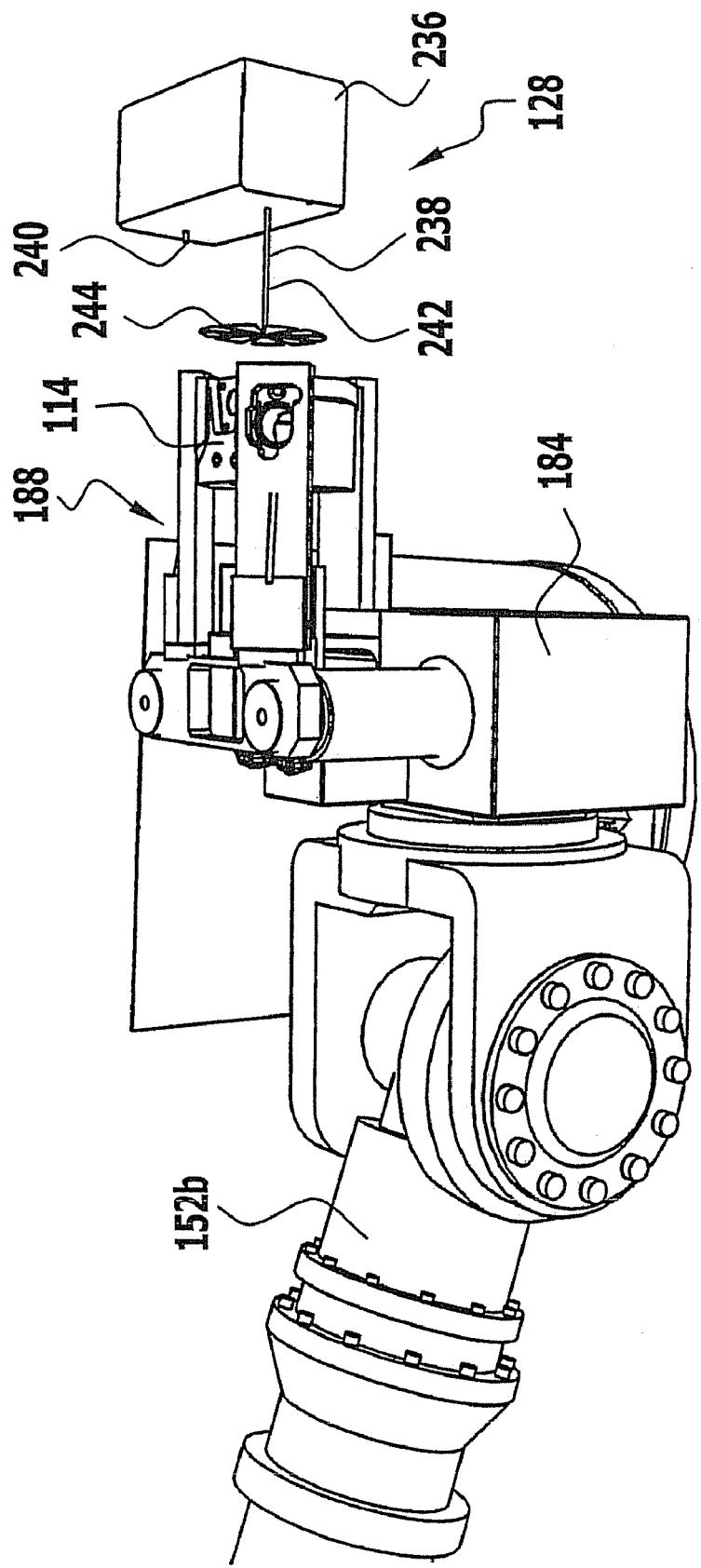
FIG. 20 a schematic perspective illustration of a deburring device of the cleaning plant with a spraying lance spraying in a radial direction and a robot arm which is holding a workpiece requiring deburring.
Figure 21:
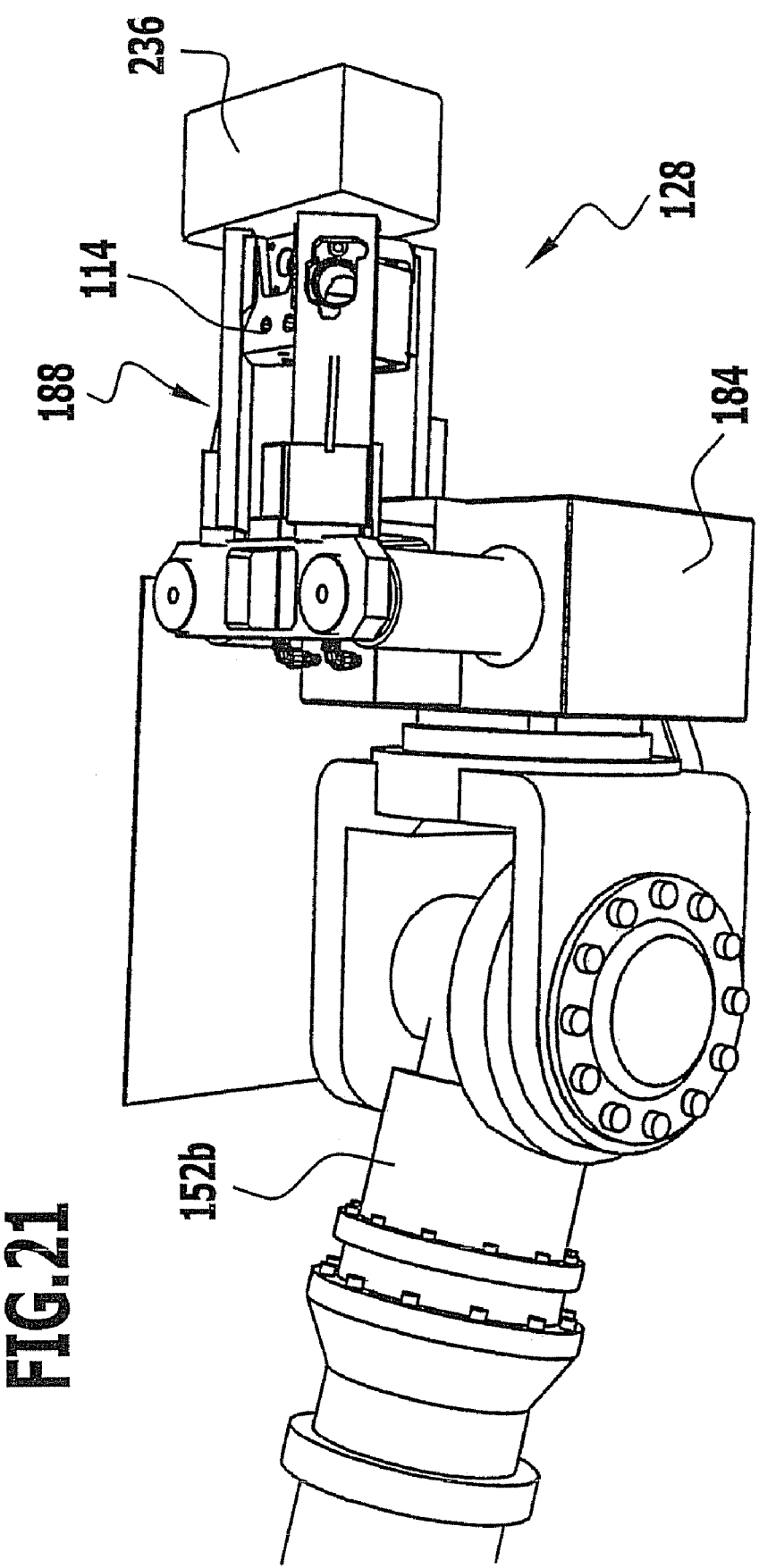
FIG. 21 a schematic perspective illustration corresponding to FIG. 20, after the workpiece has been moved relative to the spraying lance by means of the robot in such a manner that the outlet openings of the spraying lance are located within a cavity of the workpiece.
Figure 22:
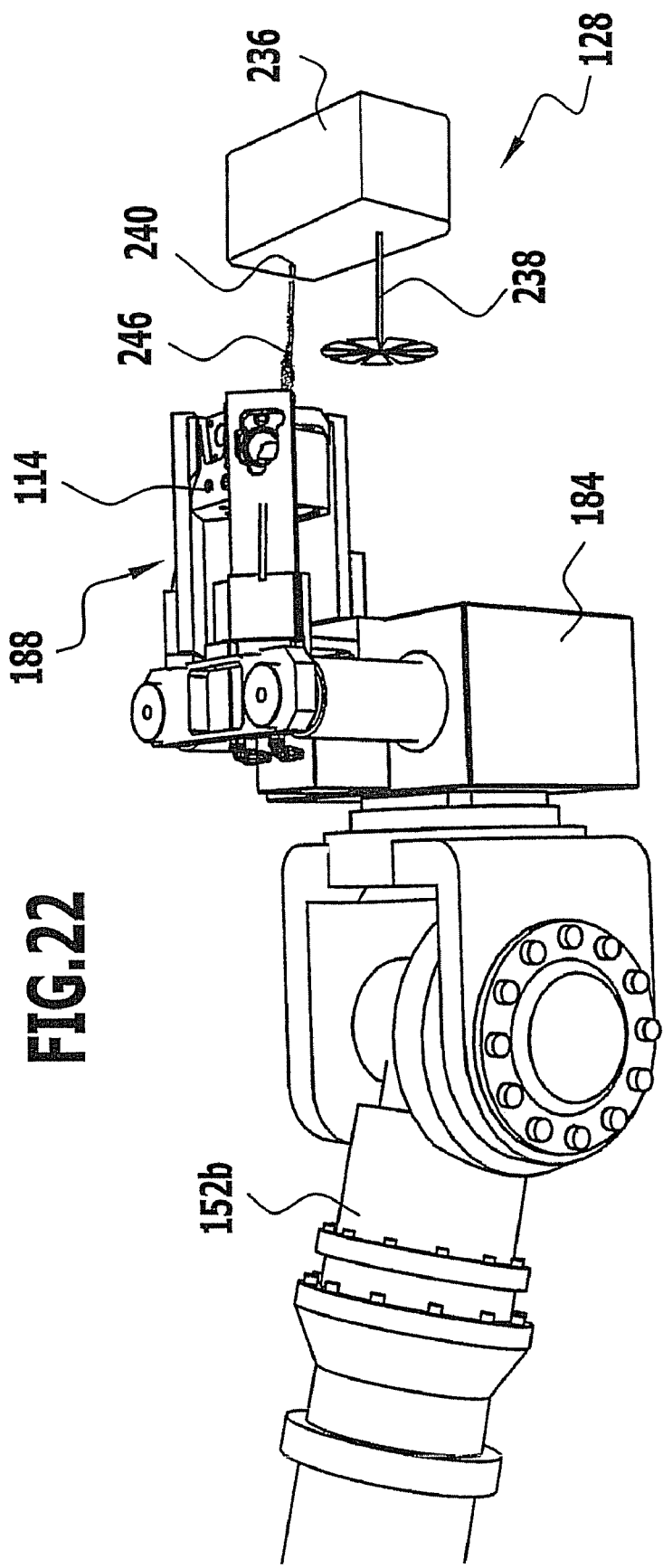
FIG. 22 a schematic perspective illustration corresponding to FIG. 20 which shows how the workpiece is deburred by means of a further spraying lance spraying in the axial direction.
Figure 23:
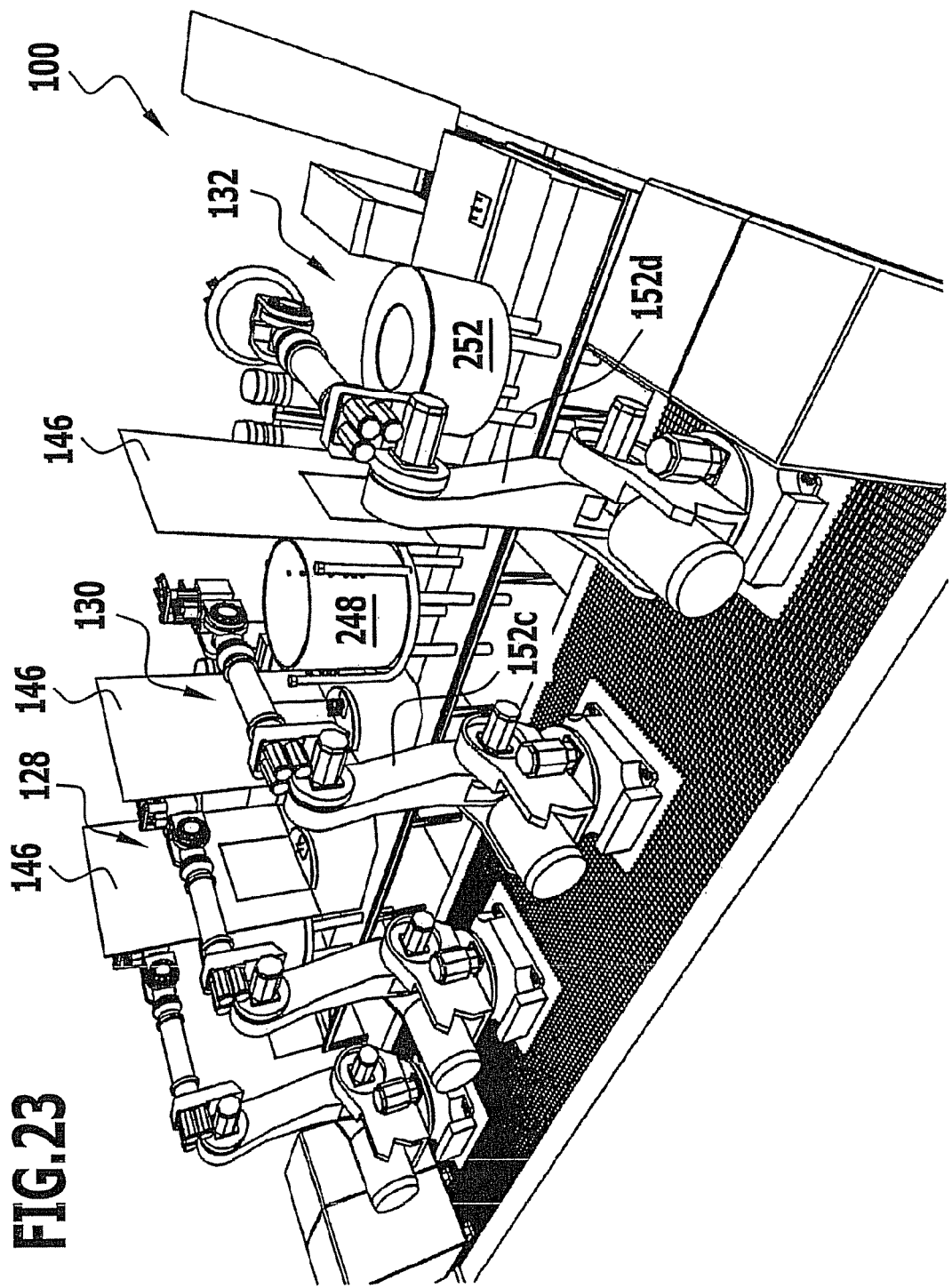
FIG. 23 a schematic perspective illustration of an injection flood washing station and a vacuum drying station of the cleaning plant with the side walls removed.

After the conclusion of the treatment in the pre-washing station 126, the workpiece 114 is placed on the workpiece retaining plate 196 by appropriate actuation of the rotary and pivotal drives of the robot 152*a* and is released by opening the gripping device 188, as is illustrated in FIGS. 17 and 18.

After the gripping device 188 has moved on from the workpiece seating region 232, the turntable 228 is rotated about its central vertical axle by means of a (not illustrated) rotary drive device so that the central wall 230 frees the passage opening 234 in the lateral partition wall 146 and the workpiece seating region 232 carrying the workpiece 114 enters the next cleaning station 122 through the passage opening 234, this station here being the high pressure deburring station 128.

At the same time, the (not illustrated) second workpiece seating region 232 of the turntable 228, which is empty at this time, leaves the high pressure deburring station 128 and enters the pre-washing station 126 due to the rotation of the turntable 128 through an angle of 180° so that the next workpiece 114 requiring treatment can be set down in this second workpiece seating region 232.

In the high pressure deburring station 128, the workpiece 114 is picked up from the workpiece retaining plate 196 by a second robot 152*b* by means of the gripping device 188 thereof in the manner previously described above and is supplied to a high pressure deburring treatment.

For the purposes of carrying out this treatment, the high pressure deburring station 128 comprises a high pressure deburring unit 236 (see FIGS. 20 to 22) which is arranged in its treatment area 142 and comprises a first deburring spraying lance 238 and a second deburring spraying lance 240.

The first deburring spraying lance 238 comprises a spraying lance pipe 242, at whose free end there are arranged a multiplicity of spraying openings which point in the radial direction and through which a liquid deburring means, water for example, emerges at a very high pressure of approximately 1000 bar for example, in the form of a plurality of deburring jets 242 that are aligned radially relative to the spraying lance pipe 242.

This first deburring spraying lance 238 serves to deburr the surfaces of cavities in the workpiece 114. For this purpose, the workpiece 114 is positioned in front of the high pressure deburring unit 236 by appropriate actuation of the rotary and pivotal drives of the robot 152*b* in such a manner that the inlet opening of a cavity therein points towards the first deburring spraying lance 238 (see FIG. 20).

Subsequently, the holding device 188 together with the workpiece 114 is moved in substantially the axial direction of the first deburring spraying lance 138 by appropriate actuation of the rotary and pivotal drives of the robot 152*b* such that the free end of the spraying lance pipe 242 gains entry into the corresponding cavity in the workpiece 114 so that the surfaces of this cavity in the workpiece 114 are subjected to the radial deburring jets 244 and thus deburred.

If the workpiece 114 comprises a plurality of cavities requiring deburring, then this deburring treatment can be repeated by means of the first deburring spraying lance 238 in that it is driven into another cavity of the workpiece 114.

The second deburring spraying lance 240 of the high pressure deburring unit 236 produces a single deburring jet 246 which is directed perpendicularly away from a side wall of the high pressure deburring unit 236 in the axial direction of the second deburring spraying lance 240 and serves for deburring the exterior surfaces of the work piece 114.

In order to enable all the exterior surfaces of the workpiece 114 requiring deburring to be subjected to the deburring jet 246, the workpiece 114 is moved relative to the deburring jet 246 within the effective range of the deburring jet 246 by appropriate actuation of the rotary and pivotal drives of the robot 152*b* such that all the exterior surfaces of the workpiece 114 requiring deburring are subjected to the deburring jet 246.

The deburring spraying lances 238, 240 of the high pressure deburring unit 236 are connected by a (not illustrated) deburring agent supply line which is provided with a controllable non-return valve and a high-pressure pump to a deburring agent tank which is arranged in the maintenance area 136 of the high pressure deburring station 128.

After the conclusion of the high pressure deburring treatment, the workpiece 114 is placed on a rotary partition 226 by the robot 152*b* in the manner previously described above and this then transfers the workpiece 114 from the high pressure deburring station 128 to the injection flood washing station 130 following thereon.

The injection flood washing station 130 illustrated in FIGS. 23 to 26 comprises an injection flood washing vessel 248 which is constructed in a manner similar to that of the pre-washing vessel 208 and in particular, is provided with spraying nozzles 212 for producing jets of fluid, in this case injection flood washing jets 250, on the inner surface of its side wall 210.

Figure 25:
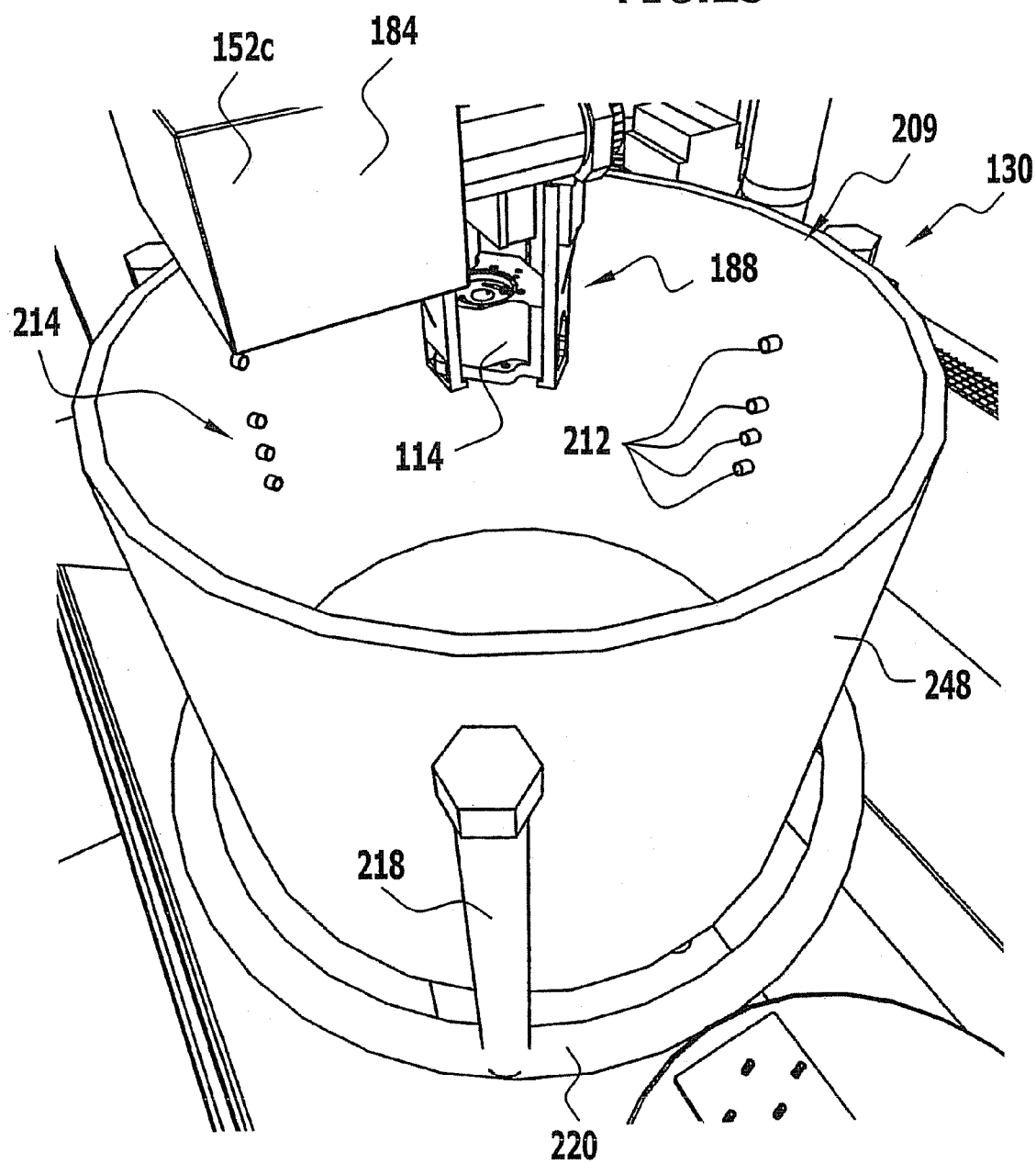
FIG. 25 a schematic perspective illustration of the injection flood washing vessel, wherein a workpiece requiring washing is just being inserted into the injection flood washing vessel from above by means of a robot.
Figure 26:
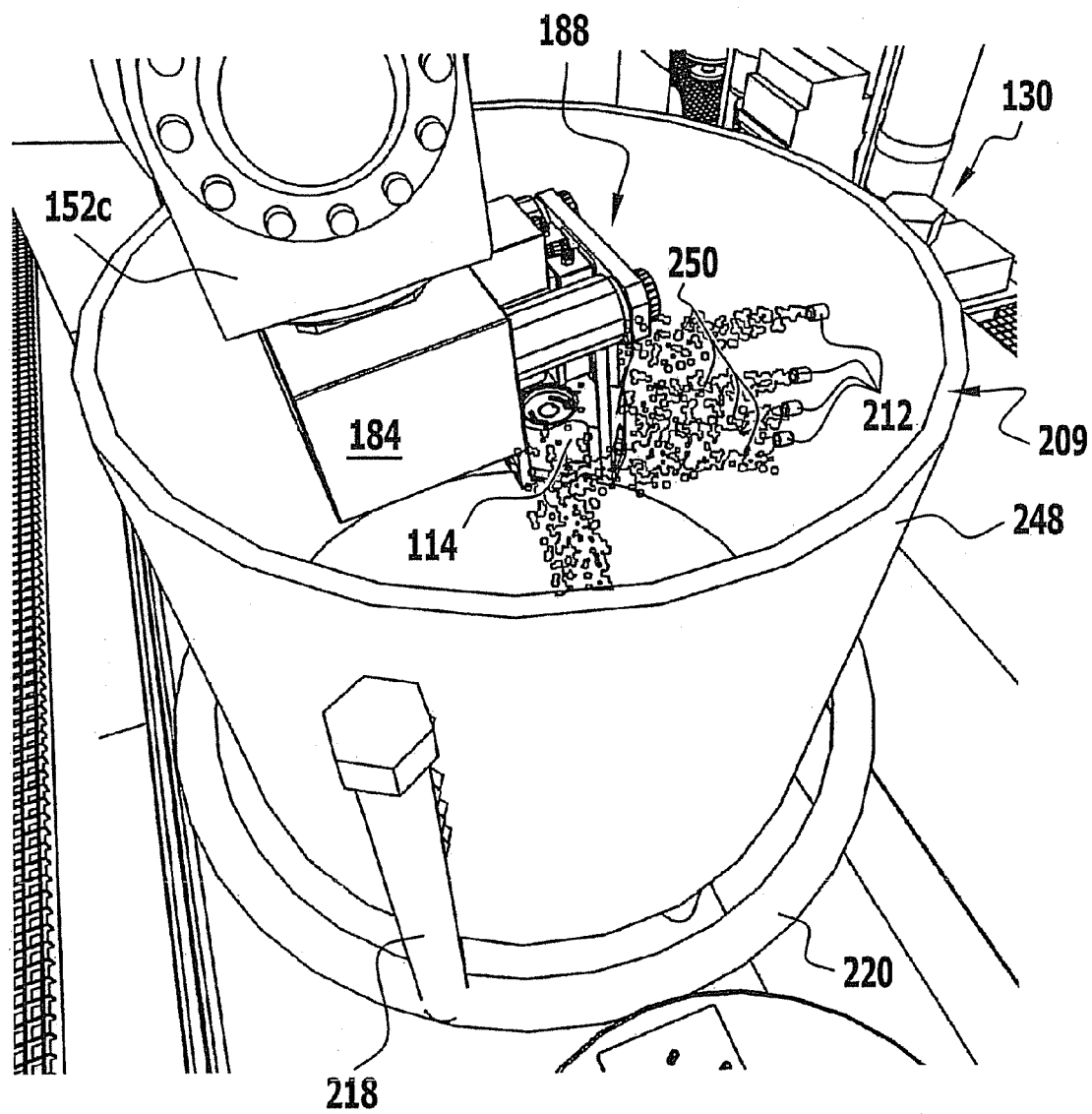
FIG. 26 a schematic perspective illustration of the injection flood washing vessel during an injection flood washing process, wherein the workpiece is being subjected to jets of cleaning fluid and is being moved relative to the flood washing nozzles by means of the robot during this process.

The workpiece 114 is picked up from the rotary partition 226 by the third robot 152*c* which is assigned to the injection flood washing station 130 in the manner previously described above, and it is then inserted, from above, through the access opening 209 into the upwardly open injection flood washing vessel 248 (see FIGS. 25 and 26).

In contrast to the pre-washing station 126 however, the injection flood washing vessel 248 of the injection flood washing station 130 is filled with a liquid cleaning agent up to a level lying above the spraying nozzles 212 so that the workpiece 114 is completely immersed in this bath of cleaning agent and is subjected to the injection flood washing jets 250 within the cleaning agent bath.

Figure 24:
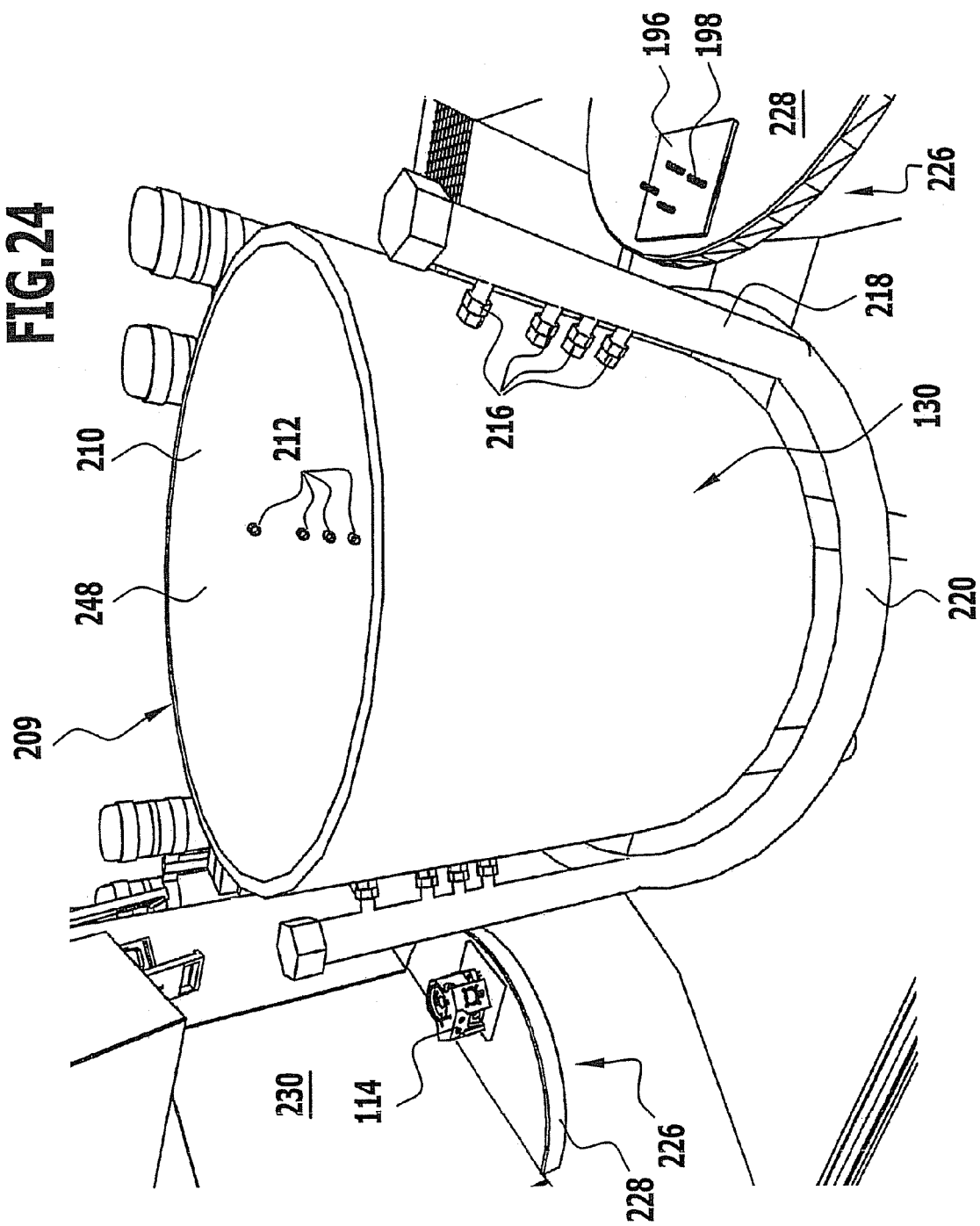
FIG. 24 a schematic perspective illustration of an injection flood washing vessel of the injection flood washing station.

For reasons of clarity, the bath of cleaning agent filling the injection flood washing vessel 248 is not illustrated in FIGS. 24 to 26.

As in the case of the pre-washing station 126, the workpiece 114 is moved relative to the injection flood washing jets within the effective range of the injection flood washing jets 250 by appropriate actuation of the rotary and pivotal drives of the robot 152*c* such that all the externally accessible surfaces of the workpiece 114 are subjected to the injection flood washing jets 250.

The spraying nozzles 212 of the injection flood washing vessel 248 are connected via the supply lines of a group of nozzles 218 and a ring line 220 as well as a (not illustrated) supply line incorporating a controllable non-return valve to a positive-displacement pump arranged in the maintenance area 136 of the injection flood washing station 130 and a cleaning agent tank.

Cleaning agent running out of the injection flood washing vessel 248 through a (not illustrated) drain is supplied to a filtration process for subsequent re-usage.

After the conclusion of the injection flood washing treatment in the injection flood washing station 130, the workpiece 114 is passed on by the robot 152c to a rotary partition 226 in the manner previously described above, and this then advances the workpiece 114 from the injection flood washing station 130 to the vacuum drying station 132 following thereon.

Figure 27:
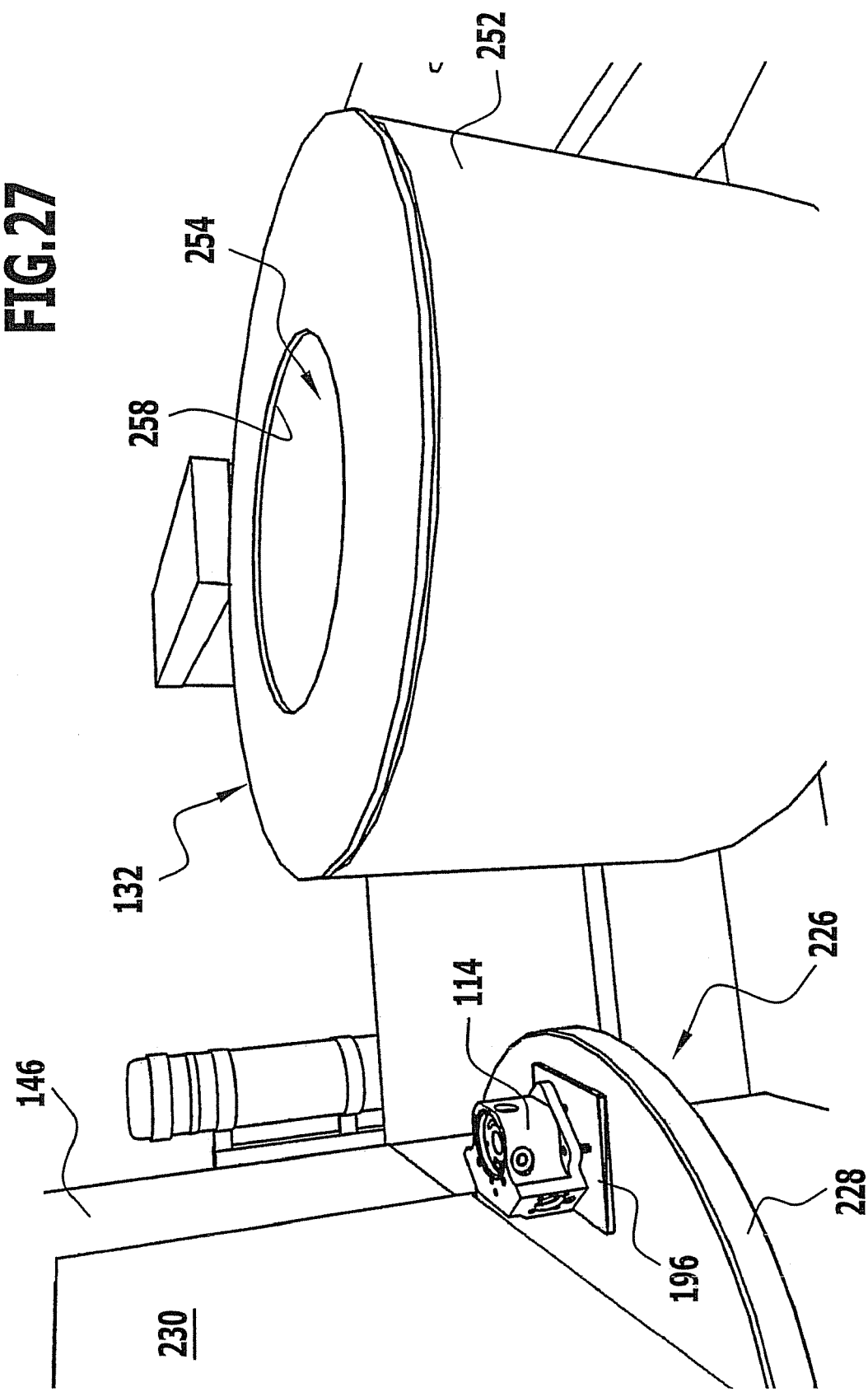
FIG. 27 a schematic perspective illustration of a vacuum container in the vacuum drying station of the cleaning plant.
Figure 28:
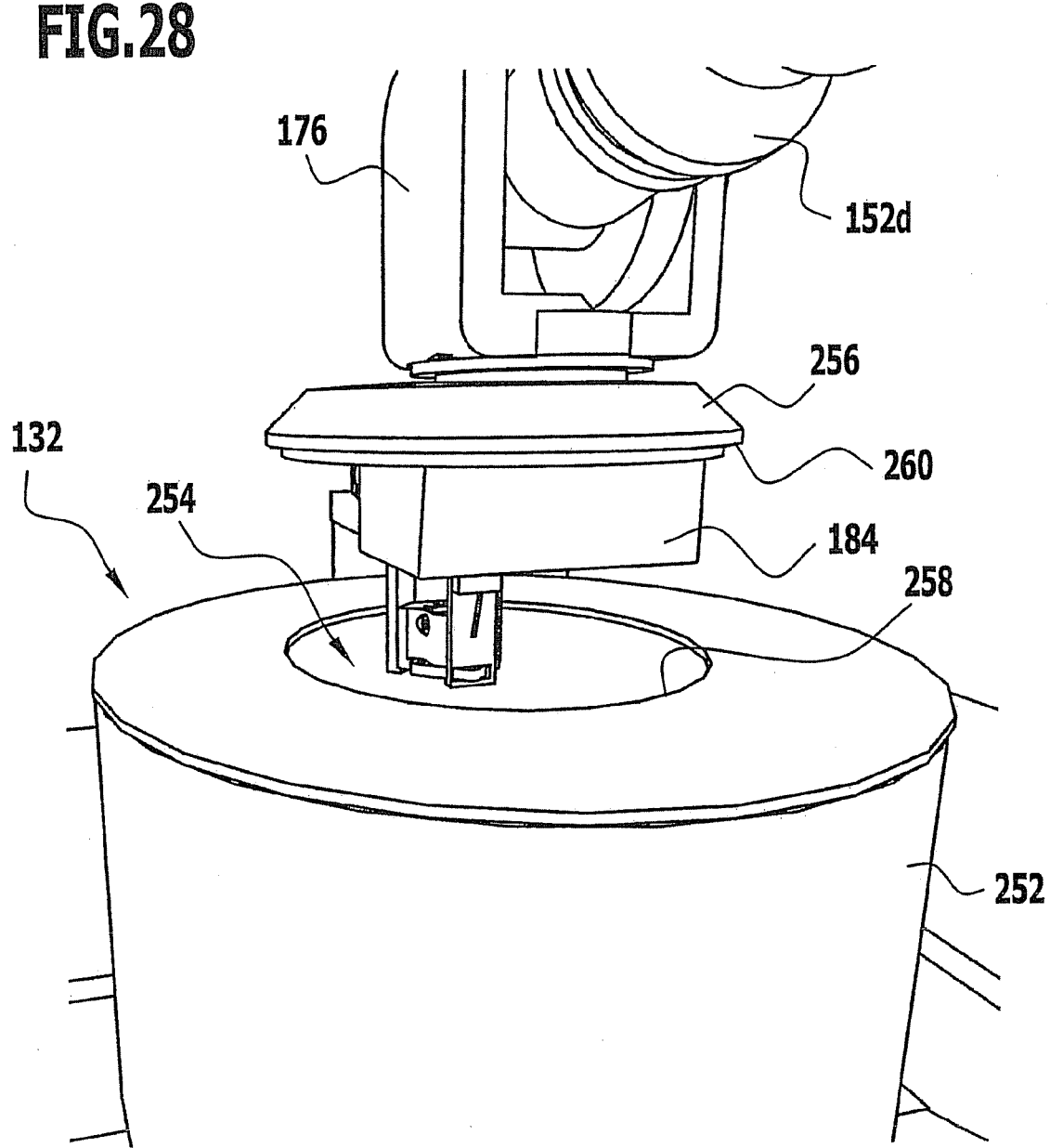
FIG. 28 a schematic perspective illustration of the vacuum container and a robot arm with a cover for the vacuum container, wherein a workpiece that is to be vacuum-dried is just being inserted into the vacuum container from above by means of the robot.

The vacuum drying station 132 illustrated in FIGS. 27 to 29 comprises a vacuum drying chamber 252 which is substantially cup-shaped and upwardly open.

The workpiece 114 is picked up from the workpiece transfer channel 226 by the fourth robot 152d assigned to the vacuum drying station 132, and is inserted, from above, through the inlet opening 258 into the interior 254 of the vacuum drying chamber 252.

The robot 152d assigned to the vacuum drying station 132 differs from the robots assigned to the rest of the cleaning stations 122 in that it is provided additionally with a closure cap 256 for the inlet opening 258 of the vacuum drying chamber 252.

This closure cap 256 is arranged on the side of the robot head 184 remote from the gripping device 188 and is provided along its lower edge with a peripheral seal 260.

The diameter of the interior 254 of the vacuum drying chamber 252 is dimensioned in such a manner that the robot head 184 together with the gripping device 188 and the workpiece 114 arranged thereon can be introduced in their entirety into the interior 254 of the vacuum drying chamber 252 until the closure cap 256 lies on the upper surface of the vacuum drying chamber 252 in the position illustrated in FIG. 29 and closes the inlet opening 258 of the vacuum drying chamber 252 in substantially gas-tight manner.

The interior 254 of the vacuum drying chamber 252 is now evacuated via a (not illustrated) vacuum line which leads to a vacuum pump arranged in the maintenance area 136 of the vacuum drying station 132 in order to expose the workpiece 114 to a vacuum drying treatment.

After the conclusion of the predetermined period for the vacuum drying process, the interior 254 of the vacuum drying chamber 252 is ventilated again, and the workpiece 114 is placed on a workpiece retaining plate 196 by the robot 152d in the manner previously described above, and from there, the workpiece 114 can be removed from the cleaning plant 100 through the withdrawal opening 118.

The process of cleaning the workpiece 114 (including the concluding drying process) in the cleaning plant 100 is thereby closed.

The invention claimed is:

1. A cleaning plant for cleaning workpieces comprising at least one cleaning station in which the workpieces are subjected to a cleaning process, and at least one manipulating device which picks up a workpiece prior to treatment in a treatment area of the cleaning station, supplies the workpiece to the treatment process in the treatment area of the cleaning station and passes on the workpiece after the treatment in the treatment area of the cleaning station,
    wherein the manipulating device exhibits at least three degrees of freedom of movement and
    wherein the cleaning plant comprises at least one vacuum station which comprises a vacuum container in which the workpiece is located under vacuum during a working process, wherein the vacuum container has an inlet opening which is closed during the working process in a substantially gas tight manner by means of a cover arranged on the manipulating device.

2. A cleaning plant in accordance with claim 1, wherein the pattern of movement of the manipulating device is controllable in a manner specific to the type of workpiece in dependence on the type of workpiece currently being handled.

3. A cleaning plant in accordance with claim 1, wherein the manipulating device exhibits at least four degrees of freedom of movement.

4. A cleaning plant in accordance with claim 1, wherein the manipulating device comprises a gripping device for grasping the workpiece.

5. A cleaning plant in accordance with claim 1, wherein the manipulating device is in the form of a robot.

6. A cleaning plant in accordance with claim 1, wherein the cleaning plant comprises a plurality of cleaning stations wherein each cleaning station has associated therewith at least one manipulating device which picks up a workpiece prior to the treatment in the treatment area of the cleaning station, supplies the workpiece to the treatment process in the treatment area of the cleaning station and passes on the workpiece after the treatment in the treatment area of the cleaning station.

7. A cleaning plant in accordance with claim 1, wherein the manipulating device is arranged in a static manner at a cleaning station.

8. A cleaning plant in accordance with claim 1, wherein the manipulating device is moveable within the cleaning plant between different cleaning stations.

9. A cleaning plant in accordance with claim 1, wherein the cleaning plant comprises at least one washing station which comprises a washing vessel in which the workpiece is located during a washing process, wherein the washing vessel has an access opening through which the manipulating device extends into the washing vessel during the washing process.

10. A cleaning plant in accordance with claim 9, wherein the access opening is arranged at the top of the washing vessel.

11. A cleaning plant in accordance with claim 1, wherein the cleaning plant comprises a deburring station which comprises at least one spraying lance.

12. A cleaning plant in accordance with claim 11, wherein the workpiece is moved within the treatment area of the deburring station by means of the manipulating device in such a way that a spraying opening of the spraying lance enters a cavity of the workpiece during the spraying process.

13. A cleaning plant in accordance with claim 1, wherein at least one cleaning station of the cleaning plant is arranged in a chamber having a chamber wall, and in that the cleaning plant comprises a workpiece moving device by means of which the workpiece is movable from one side of the chamber wall to the other side of the chamber wall through a passage opening in the chamber wall.

14. A cleaning plant in accordance with claim 13, wherein the workpiece moving device comprises a turntable.

15. A cleaning plant in accordance with claim 1, wherein the workpiece is held on the manipulating device during the treatment in the treatment area of the cleaning station.

16. A cleaning plant in accordance with claim 15, wherein the workpiece is movable relative to a treatment device of the cleaning station by means of the manipulating device during the treatment in the treatment area of the cleaning station.

* * * * *